(12) United States Patent
Chernyak et al.

(10) Patent No.: US 8,367,181 B2
(45) Date of Patent: Feb. 5, 2013

(54) APPARATUS AND METHODS FOR MAKING PILE ARTICLES AND IMPROVED PILE ARTICLES MADE THEREWITH

(75) Inventors: Alexander Z. Chernyak, Pittsford, NY (US); Richard T. Arvidson, Fairport, NY (US); Alan J. DeMello, Newmarket, NH (US); Grant E. Wylie, Brookings, SD (US)

(73) Assignee: Ultrafab, Inc., Farmington, NY (US)

( * ) Notice: Subject to any disclaimer, the term of this patent is extended or adjusted under 35 U.S.C. 154(b) by 0 days.

(21) Appl. No.: 12/924,179

(22) Filed: Sep. 22, 2010

(65) Prior Publication Data

US 2011/0047880 A1 Mar. 3, 2011

Related U.S. Application Data

(62) Division of application No. 11/793,247, filed as application No. PCT/US2005/025015 on Jul. 15, 2005, now Pat. No. 7,824,513.

(30) Foreign Application Priority Data

Dec. 17, 2004 (WO) ................ PCT/US2004/043314

(51) Int. Cl.
*E06B 7/16* (2006.01)
*B32B 3/02* (2006.01)
(52) U.S. Cl. ............. 428/86; 428/92; 428/95; 49/475.1; 49/479.1; 49/495.1; 49/381
(58) Field of Classification Search ............. 428/93, 428/92, 88, 95, 86; 49/475.1, 479.1, 495.1, 49/381
See application file for complete search history.

(56) References Cited

U.S. PATENT DOCUMENTS

| | | | |
|---|---|---|---|
| 3,041,230 A | 6/1962 | Deihl | |
| 3,422,511 A | 1/1969 | Seguin | |
| 3,646,647 A | 3/1972 | Klein | |
| 3,649,411 A | 3/1972 | Bolles | |
| 3,921,265 A | 11/1975 | Eschenbach | |
| 4,148,953 A | 4/1979 | Horton | |
| 4,302,494 A | 11/1981 | Horton | |
| 4,576,672 A | 3/1986 | Kobayashi et al. | |
| 5,338,382 A | 8/1994 | Johnson et al. | |
| 5,965,262 A | 10/1999 | Whisler et al. | |
| 6,096,151 A | 8/2000 | Edwards et al. | |
| 6,252,757 B1 | 6/2001 | Loughney et al. | |
| 6,711,858 B1 | 3/2004 | Albanese et al. | |
| 7,172,006 B2* | 2/2007 | Day et al. ...................... | 156/445 |
| 7,329,450 B2* | 2/2008 | Wylie et al. ..................... | 428/95 |
| 7,335,412 B2* | 2/2008 | Wylie ............................ | 428/88 |
| 7,727,350 B2* | 6/2010 | Hawkins et al. ............... | 156/174 |
| 7,829,174 B2* | 11/2010 | Kanzaki et al. ................. | 428/93 |
| 7,896,995 B2* | 3/2011 | Wylie et al. .................... | 156/72 |
| 2006/0049559 A1* | 3/2006 | Ohara et al. ................... | 267/148 |

FOREIGN PATENT DOCUMENTS

| | | |
|---|---|---|
| WO | WO 2004/042248 | 5/2004 |
| WO | WO 2005/113239 | 12/2005 |

\* cited by examiner

*Primary Examiner* — Cheryl Juska
(74) *Attorney, Agent, or Firm* — Kenneth J. Lukacher Law Group

(57) ABSTRACT

Filamentary materials, such as yarn (18), is wound a frame (28), provided by pairs of movable filaments or wires (35, 38), about which the end of the spindle (22) rotates provides the turns (26) of the winding as the article having the winding is moved along a process path. Mechanically or hydraulically actuated pins (34) support the winding frame in a fixed position. The filaments of the frame may be provided by laterally spaced pairs (44, 46) of filaments of weldable material.

16 Claims, 30 Drawing Sheets

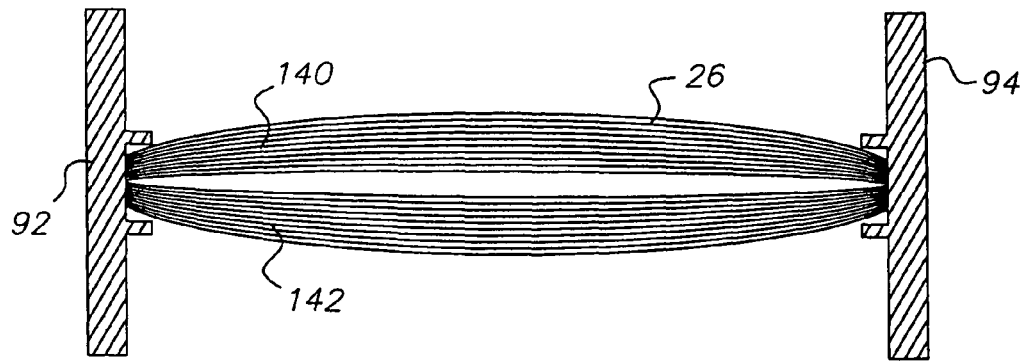
FIG. 15
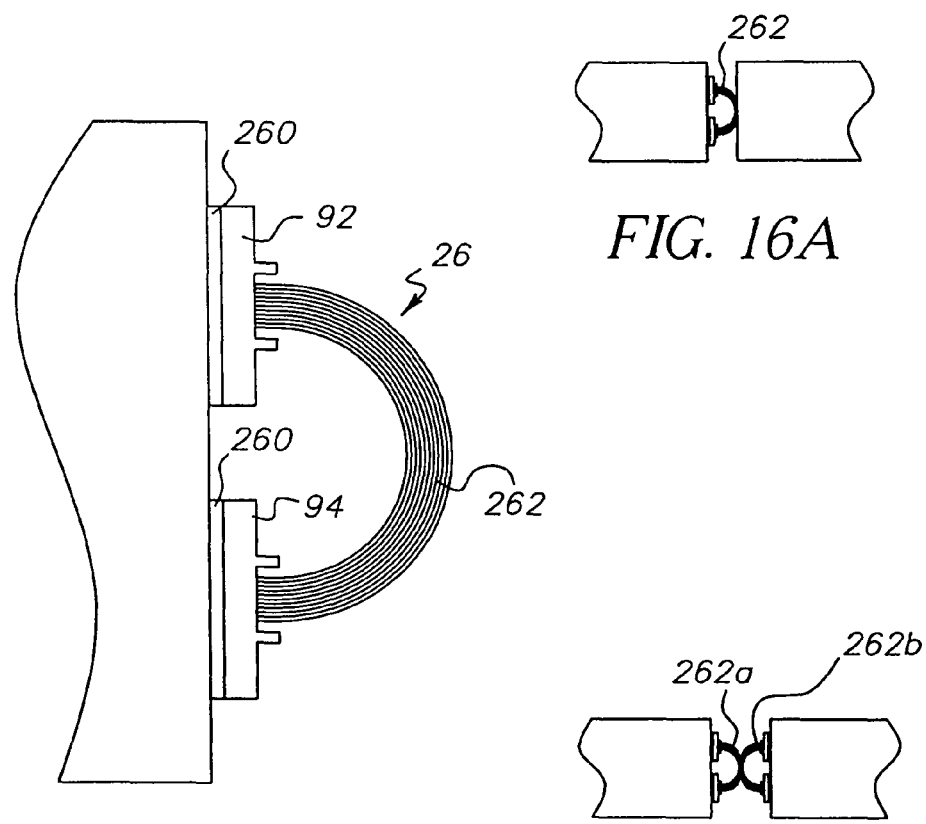
FIG. 16
FIG. 16A
FIG. 16B

APPARATUS AND METHODS FOR MAKING PILE ARTICLES AND IMPROVED PILE ARTICLES MADE THEREWITH

This application is a divisional of U.S. patent application Ser. No. 11/793,247, filed Jun. 15, 2007, now U.S. Pat. No. 7,824,513, issued Nov. 2, 2010.

The present invention relates to apparatus and methods for making pile articles of filamentary materials, such as yarn and thread, which articles are especially suitable for use as weatherseals or bristles for brushes. A weatherseal made using the apparatus and methods of the invention may have a continuous loop supported at the ends thereof so as to form a bow or arch which provides resilient support for a frame, door, or window sash.

This invention is an improvement over the methods and apparatus for fabricating pile articles, especially brushes and weatherseals by winding the filamentary material (referred to herein as yarn) about a frame around which a spindle rotates. The frame is provided by pairs of filaments which define the ends of the loops of yarn wound on the frame as the spindle rotates thereabout. Such methods and apparatus are the subject matter of International Patent Application No. PCT/US04/43314, filed Dec. 17, 2004, and corresponding to U.S. patent application Ser. No. 11/793,246, now U.S. Pat. No. 7,727,350, issued Jun. 1, 2010. The pile articles provided by the present invention have continuous pile loops which need not be slit in order to remove the article from the apparatus from which it is made. Such continuous loop pile articles may have the pile configured so as to provide a resilient support. The support may be provided by a bow or arch of the loops. The pile articles provided by the invention are improvements over pile articles described in International Patent Application No. PCT/US03/34393, filed Oct. 30, 2003, published under International Publication No. WO 2004/042248 on May 21, 2004, and corresponding to U.S. patent application Ser. No. 10/532,749 (U.S. Patent Application Publication No. 2006/0049559, and International Patent Application No. PCT/US04/12878, filed Apr. 27, 2004, and corresponding to U.S. patent application Ser. No. 11/587,607, now U.S. Pat. No. 7,829,174, issued Nov. 9, 2010.

Pile articles, such as weatherseals and brushes, especially used for discharge of static electricity and methods and apparatus for making them by winding of yarn around a moving band or mandrel, are described in Horton, U.S. Pat. No. 4,148,953 issued Apr. 10, 1979, and Horton, U.S. Pat. No. 4,302,494 issued Nov. 24, 1981, and also in Johnson et al., U.S. Pat. No. 5,338,383 issued Aug. 16, 1994. Methods and apparatus using winding techniques to make brushes for discharge of static electricity are described in Loughney et al., U.S. Pat. No. 6,252,757 issued Jun. 26, 2001.

U.S. Pat. No. 6,711,858 issued Mar. 20, 2004 to James V. Albanese and David N. Hawkins also describes pile articles, particularly weatherseals, which may be made by the methods and apparatus provided by the invention.

In the method and apparatus of that International Application No. PCT/US04/43314, the frame is fixedly supported at the upstream end of the process path, along which the pile articles are produced, by utilizing a scotch yoke mechanism. The scotch yoke is contained in a support at the upstream end of the path from which the frame forming filaments extend to define the winding frame. The scotch yoke drives pins to execute reciprocal motion across a gap through which the winding spindle rotates. The gap is between a frame support including the scotch yoke and an external yoke which forms a stationary base. The pins are reciprocated in synchronism with the rotation of the spindle. Accordingly, even though one or more of the pins enters the external yoke to provide a stationary support for the frame, the pins retract and clear the gap to provide clearance for the spindle. The scotch yoke is subject to vibration as it operates; thus limiting the speed of reciprocation of the support pins and the winding rate, which is determined by the speed of rotation of the spindle. One important feature of the present invention to enable the pile articles made by winding of the yarn around the frame at a faster rate than may practically be obtained with the methods and apparatus described in International Patent Application No. PCT/US04/43314.

The production rate is also enhanced, in accordance with the feature of the invention, by binding the ends of the loops through the use of ultrasonic energy. The application of such energy facilitates the use of ultrasonic weldable material such as plastic monofilaments (preferably of the same material as the yarn) to provide the winding frame. Such filaments, and if desired a backing strip, may be welded together with the yarn loops at the ends of the loops, preferably with the aide of ultrasonic welding heads.

A further feature of the invention is to provide weatherseals having continuous loops which need not be slit in order to remove the assembled weatherseals from the winding frame. To this end, the winding frame may be provided by loops of wire which extend to the upstream end thereof at the support. The support is maintained stationary, preferably by mechanical, fluid pressure operated (pneumatic or hydraulic) or electromagnetic means provided by the invention. The loops of the winding frame terminate at the upstream end of the process path and extend along the path downstream from the station where attaching members, such as the backing strips mentioned above, may be assembled, preferably by ultrasonic welding, to the ends of the loops. The yarn loops themselves pass around the frame forming loops and thus need not be cut in order to remove the pile article from the winding frame.

The invention provides, therefore, a weatherseal made of a continuous loop attached only at the ends thereof and which may be arranged in a bow or arch or in a bridge for supporting and/or sealing a window sash or doorframe.

Still another feature of the invention is providing methods and apparatus for producing pile articles at high speed, even though the winding frame is held rotationally stationary and the winding spindle must rotate about the winding frame. This feature may be accomplished using a stationary base. Mechanically or fluid pressure actuated pins are movable by the base across the gap to the frame support. The actuating mechanism may be coupled to a shaft which rotates the spindle so as to synchronize the movement of the pins with the rotation of the spindle, thereby insuring that the pins clear the gap when the spindles pass the pins. At least one of the pins is in supporting relationship with the frame so that the frame is held in a stationary fixed relationship with the base. An electromagnetic structure for supporting the frame and allowing the spindle to pass unobstructed through the gap may be afforded by a stator ring connected to the base, which is magnetically coupled to an armature attached to the support for the upstream end of the frame. The magnetic field may be provided by permanent magnets in the stator which direct the field to the armature and hold the armature stationary, and the winding frame support with the stator.

The foregoing and other objects, features and advantages of the invention will become more apparent from a reading of the following description in connection with the accompanying drawings which are described briefly as follows:

FIG. 15 is a sectional view through the continuous loop pile article which is made with the apparatus illustrated in FIGS. 5-7;

FIG. 16 illustrates the pile article shown in FIG. 15 configured to form a bow or arch so as to provide a weatherseal;

FIGS. 16A and 16B show the pile article of FIG. 16 configured to provide a weatherseal for a door or for double doors, respectively;

Figure 36:
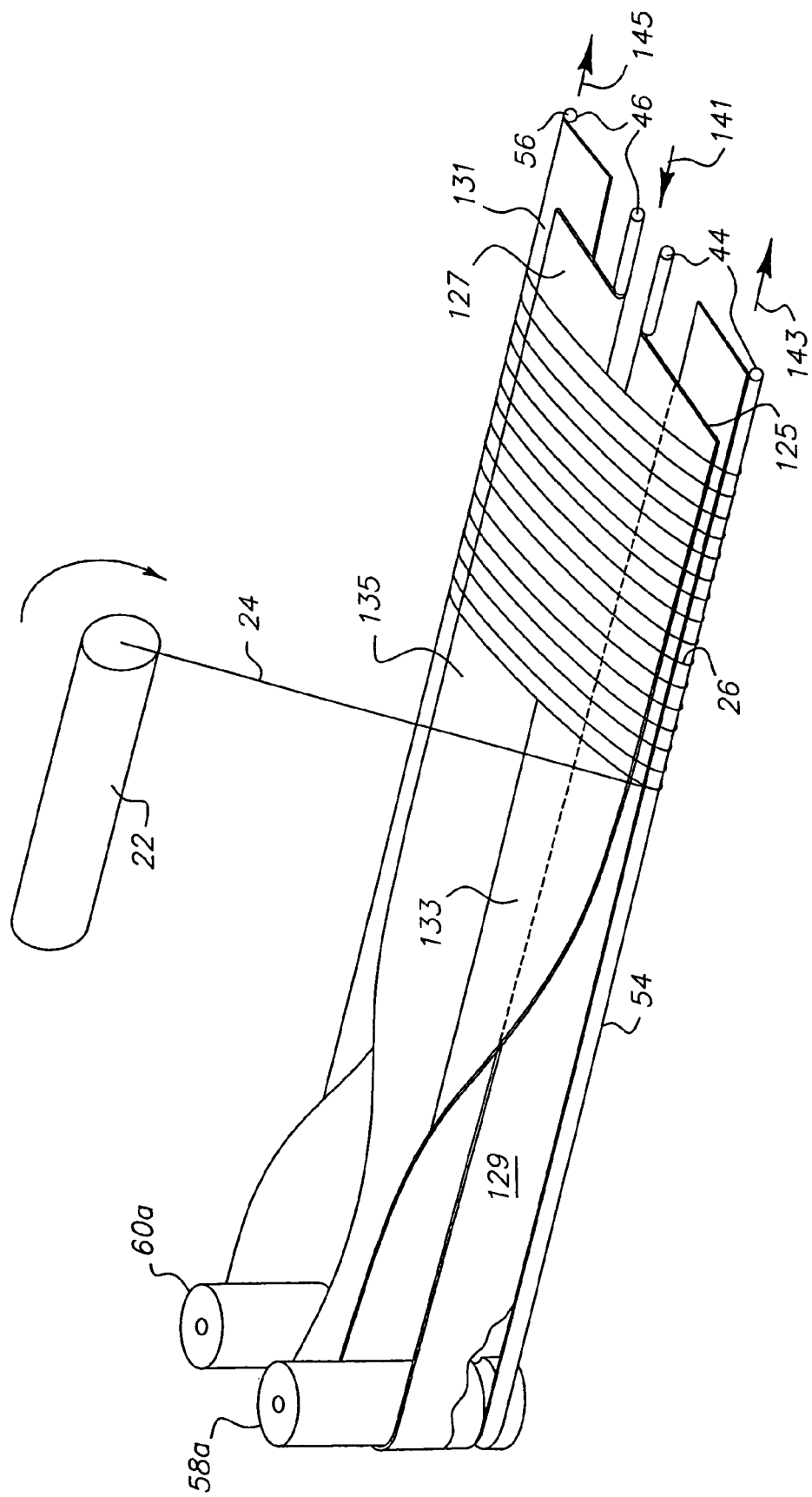
Figure 37A:
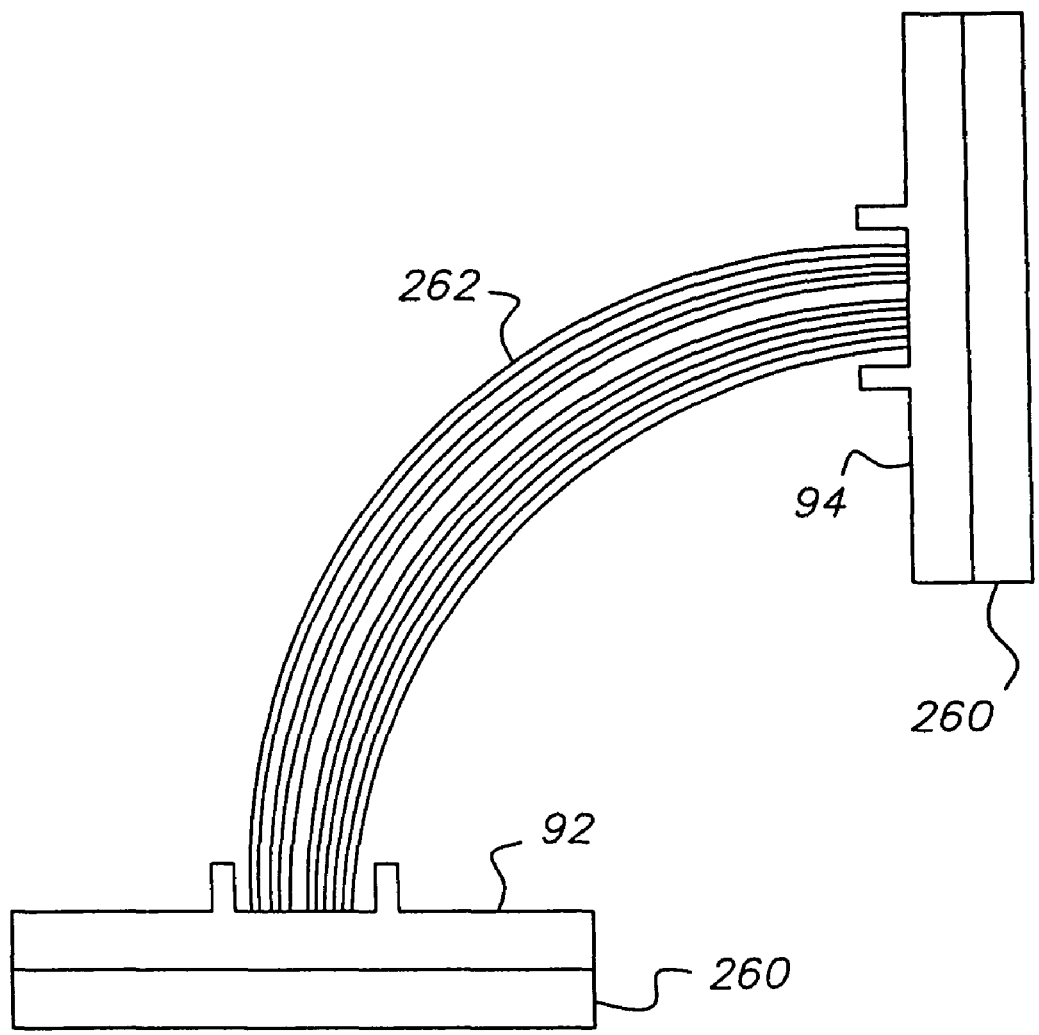
Figure 37B:
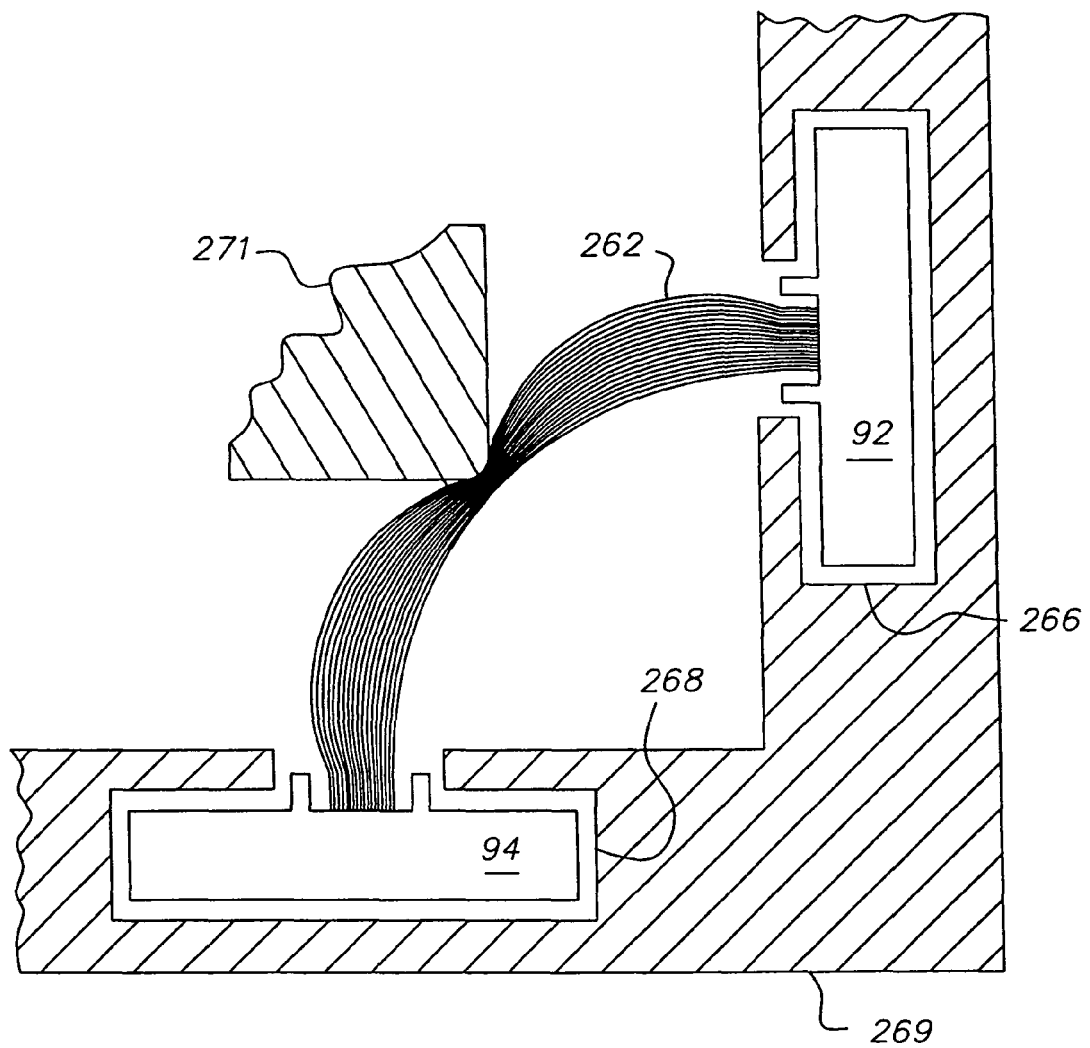

FIG. 36 is a perspective view schematically illustrating the incorporation of fin material into the pile article between the sides of the loops of yarn thereof; and FIGS. 37A and 37B are sectional views illustrating the pile article of FIG. 15 where the backings are perpendicular to each other as in the inside corner of a frame (FIG. 37B) so that the bow or arch extends across the corner and provides a resilient support and may provide a seal against a member which moves with respect to the frame into the corner.

DETAILED DESCRIPTION

Figure 1:
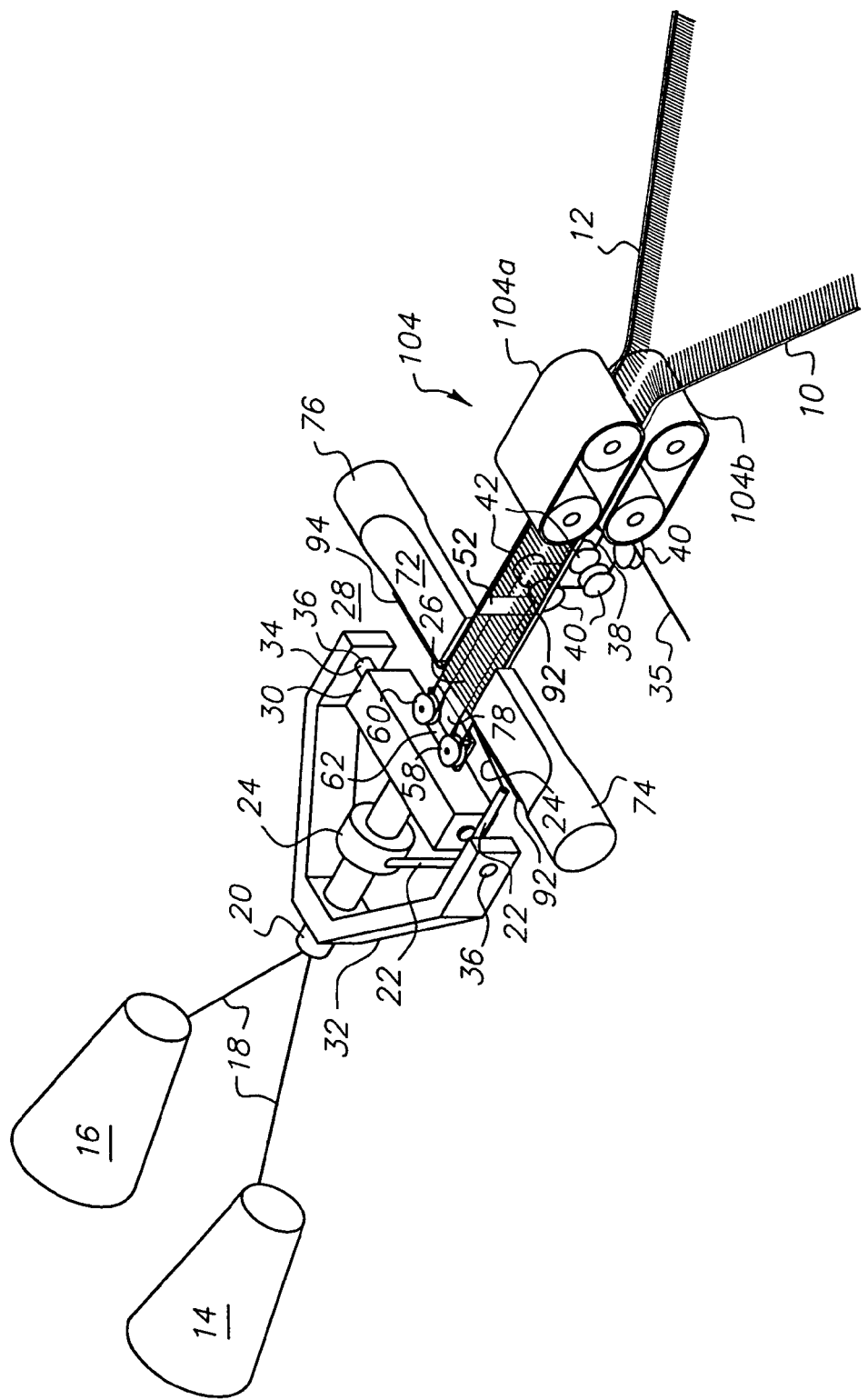
FIG. 1 is a perspective view schematically illustrating the apparatus in accordance with a first embodiment of the invention, wherein a monofilament of ultrasonically weldable material provides the winding frame in a winding station where the loops of yarn are wound to form the pile.
Figure 2:
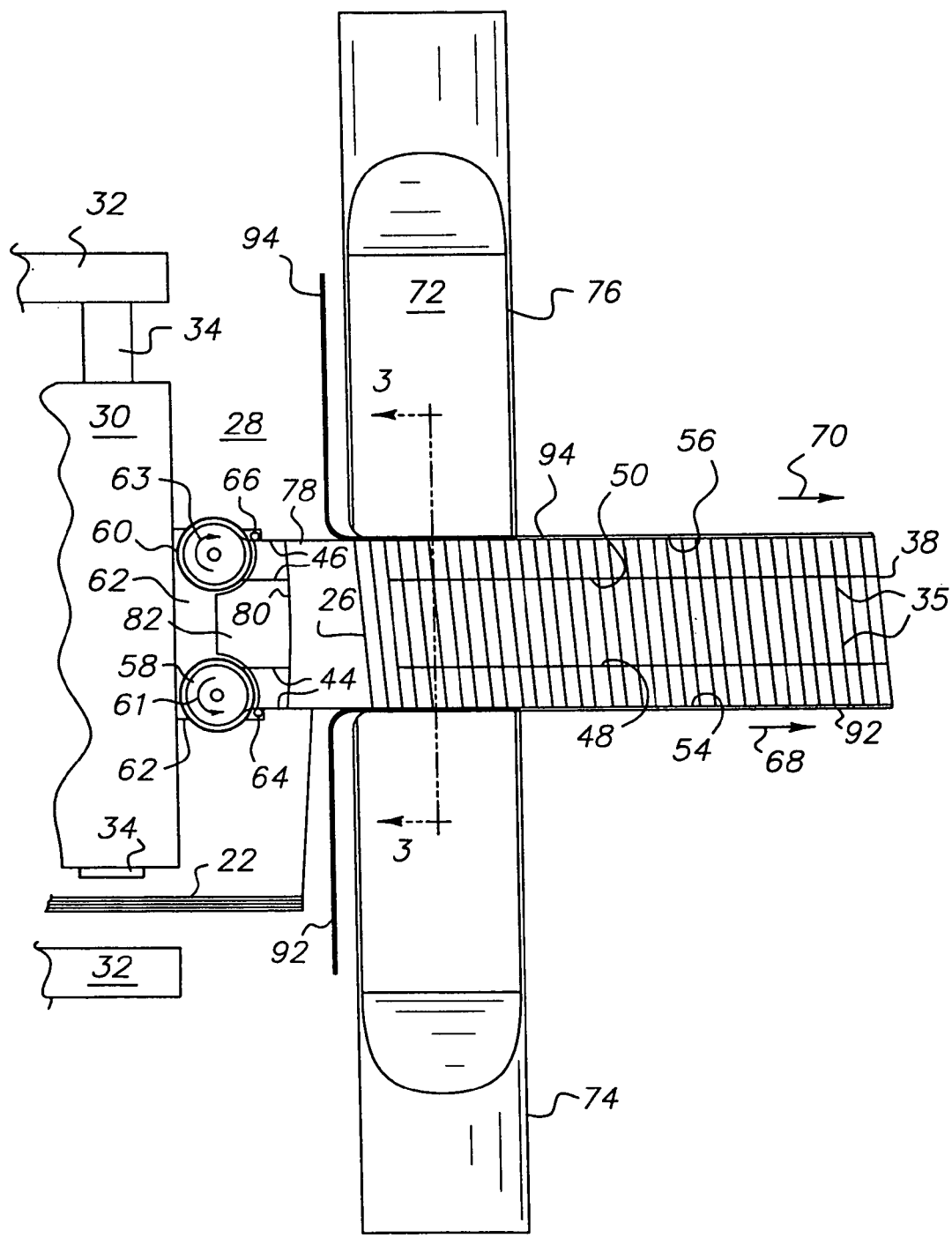
FIG. 2 is a plan view of the winding and binding station of the apparatus as shown in FIG. 1.
Figure 3:
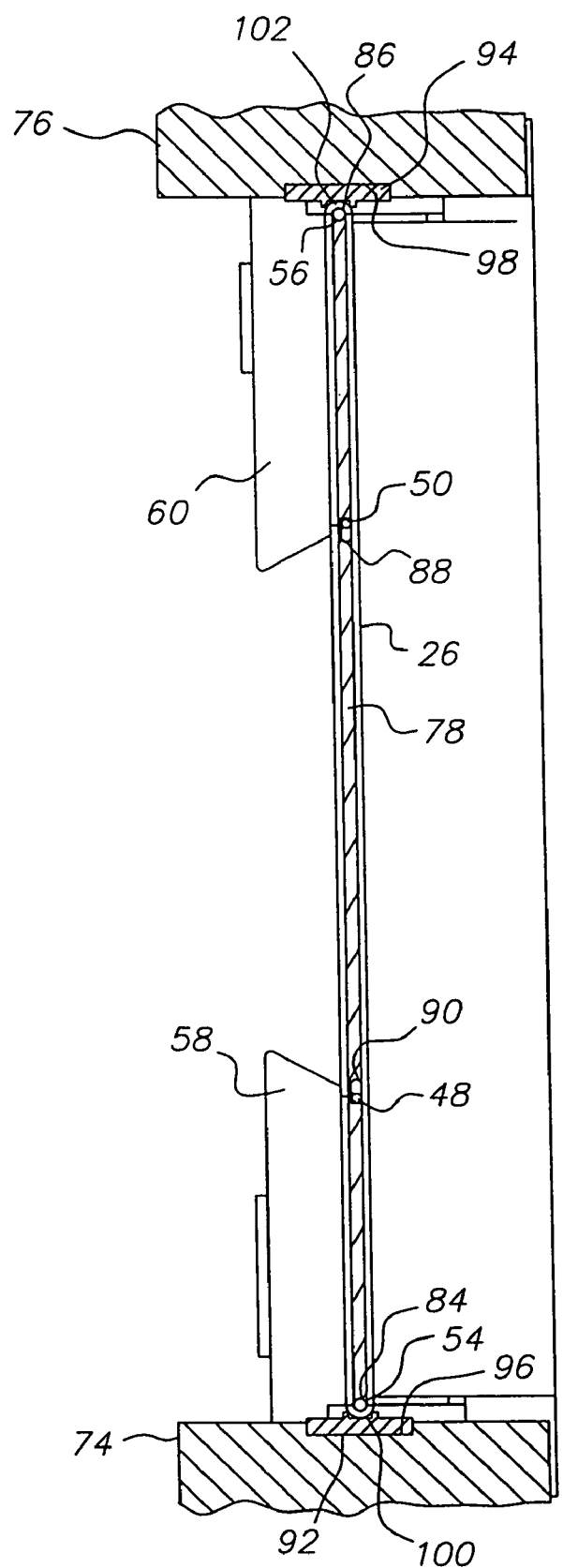
FIG. 3 is a fragmentary sectional view taken along the line 3-3 in FIG. 2.

Referring to FIGS. 1, 2 and 3, there is shown an apparatus for making pile articles, more particularly a pair of pile weatherseals or weatherstripping 10 and 12, similar to the weatherstripping shown in the above referenced Horton and Johnson et al. patents. The process path for making the weatherstripping starts with an array of a plurality of stationary spools, two of such spools 14 and 16 are shown in FIG. 1 to simplify the illustration. Filamentary material provides the pile of the pile article product 10 and 12. The filamentary material is yarn of ultrasonically weldable material, such as polypropylene. The yarn is formed by twisting threads 18 as they are drawn from the spools 14 and 16 in a tubular shaft 20. A hollow spindle 22 is attached at a collar 24 and rotated with the shaft 20. A gear or belt drive which rotates the shaft 20 is not shown in FIG. 1. Yarn is drawn from the spindle and helically wound into loops 26 at a stationary winding station 28. The term yarn is used generically herein to note the filamentary material which is wound to form the pile of the pile article product, which in the illustrated case are the pile weatherseals 10 and 12.

The winding station 28 is supported in fixed or stationary position by a mechanism in a support structure 30. The shaft 20 may be journalled in bearings in the support structure 30. The support structure 30 is held stationary, in a manner to allow the rotation of the spindle 22 about the support structure, by means of a stationary yoke 32. Pins 34 are reciprocated outwardly from the ends of the support structure into openings 36 in the yoke 32. The reciprocation is motivated by a scotch yoke mechanism in the support structure 30 which is driven by the shaft 20. Preferably the support structure 30 and winding station 28 are maintained fixed and stationary by pins which are driven inwardly by mechanical or fluid (pneumatic) drive means from the yoke 32, as discussed hereinafter in connection with FIGS. 8 and 9 for the mechanical drive means, and in connection with FIGS. 10-12 for the fluid actuated (pneumatic) drive means. The mechanical and pneumatic drive means are actuated in synchronism with the rotation of the shaft 20 so that the pins clear the gap through with the spindle 22 rotates as the spindle passes the support structure. The support structure 30 and the winding station 28 may also be held stationary magnetically by means which establishes a stationary magnetic field which extends through the path of rotation of the spindle 22. The spindle 22 then being made of non-conductive material. The magnetic support constitutes a magnetic chuck and is described hereinafter in connection with FIGS. 13 and 14.

As shown in FIGS. 1-3, the winding frame, on which the loops of yarn are wound, is provided by pairs of filaments 35 and 38, preferably plastic monofilaments; the material being ultrasonically weldable. Polypropylene monofilaments are especially suitable for use in providing the winding frame. Specifically, the monofilaments 35 and 38 are drawn from spools (not shown). A first set of rollers 40 guides the monofilament 35 and a second similar set of rollers 42 guides the monofilament 38. Thus, the winding frame is provided by parallel loops 44 and 46 of the monofilaments 35 and 38, respectively. These loops 44 and 46 have inner sides 48 and 50 which extend from the roller sets 40 and 42, respectively. The monofilaments enter through the loops of yarn, after they are slit, by a slitter, such as a knife blade 52. The loops 44 and 46 have outer sides 54 and 56, respectively, which define the ends of the loops 26 of yarn.

Rollers 58 and 60 which are free to turn, and turn in the direction of the arrows 61 and 63 on shafts attached to a bracket 62. The monofilament loops 44 and 46, on the outsides 54 and 56 thereof, are guided by pins 64 and 66 projecting from the bracket 62. The filaments on the outsides 54 and 56 of the loops are drawn in the direction of the arrows 68 and 70 along the process path.

The loops of yarn are assembled, by ultrasonic welding, at a binding station 72 spaced along the process path from the winding station 28 by a distance sufficient to enable a few loops to be wound around the winding frame provided by the monofilament loops 44 and 46. The density of the pile depends on the density of the yarn as it is wound. This density is controlled by the speed of travel of the pile product along the process path.

The binding station 72 is provided by a pair of ultrasonic horns 74 and 76 which are driven by ultrasonic vibrators (not shown) to vibrate in a lateral direction (transverse to the processing path) against an anvil 78. The anvil 78 is attached at one end thereof to the bracket 62 and may be thinner (starting at a step, 80) than a tongue 82 of the anvil 78. The anvil 78 may have notches 84 and 86 (FIG. 3), along the edges thereof, in which the outsides 54 and 56 of the monofilament loops 44 and 46 are guided. The insides 48 and 50 of the loops 44 and 46 may be guided by other notches 88 and 90 in the surface of the anvil.

Backing strips 92 and 94 of ultrasonically weldable material, such as polypropylene, are guided from spools thereof (not shown) into notches 96 and 98 (FIG. 3) in the welding heads (also called horns) which are disposed in contact with the opposite ends of the loops 26. These backing strips may have channels in which the opposite ends 100 and 102 of the yarn loops are aligned. The backing strips may be similar to the backing strips used in providing the weatherseals in the above referenced Horton and Johnson et al. patents.

At the binding station 72, the monofilaments 35 and 38 (at their outsides 54 and 56 of the frame loops), the yarn loops 26, and the backing strips 92 and 94 are ultrasonically welded together into a composite, assembled pile article. If desired, the pile article may be made without backing strips, in which the assembly consists of the yarn and the monofilaments which are bound (welded) at the ends of the loops. The loops may be backed by textile or fabric bands instead of plastic backing strips. These bands facilitate installation of pile articles by sewing into a support (see FIG. 35). Textile backed pile articles and the fabrication thereof are described in International Patent Application No. PCT/US03/32763 having priority to U.S. patent application Ser. No. 10/272,065, filed Oct. 16, 2002, now U.S. Pat. No. 7,329,450, issued Feb. 12, 2008, in the name of Grant E. Wylie et al. and assigned to the same assignee as this Application.

The welding horns 74 and 76 may be offset along the processing path to minimize coupling of the vibratory ultrasonic energy between the horns. Alternatively, the anvil 78 may have an insert of yieldable materials which acts as a vibration isolator.

The assembled and slit product is driven at a driving or transport station 104 downstream of the slitter 52. The transport station 104 has a pair of belts 104a and 104b over motor driven pulleys which are biased into engagement with the edges of the backing 92 and 94 and the yarn. The driving force propels the product downstream along the processing path. Take-up reels (not shown) may be provided on which the pile weatherseal product is wound for shipment to customers. The driving force for joining the threads 18 from the spool array 14 and 16 and for drawing the monofilament along the frame loops 44 and 46 as well as for driving the products to take up reels is provided by the driven belts in the transport station 104. Except for the winding station 28, using the frame of ultrasonically weldable monofilament loops 44 and 46 and the winding station having the ultrasonic welding means provided by the horns 74 and 76 and the anvil 82, the apparatus illustrated in FIGS. 1, 2 and 3 is similar to the apparatus described in the above referenced International Application No. PCT/US04/43314 and reference may be had to that Application for further information with respect to the components of the apparatus shown in FIG. 1.

Figure 4:
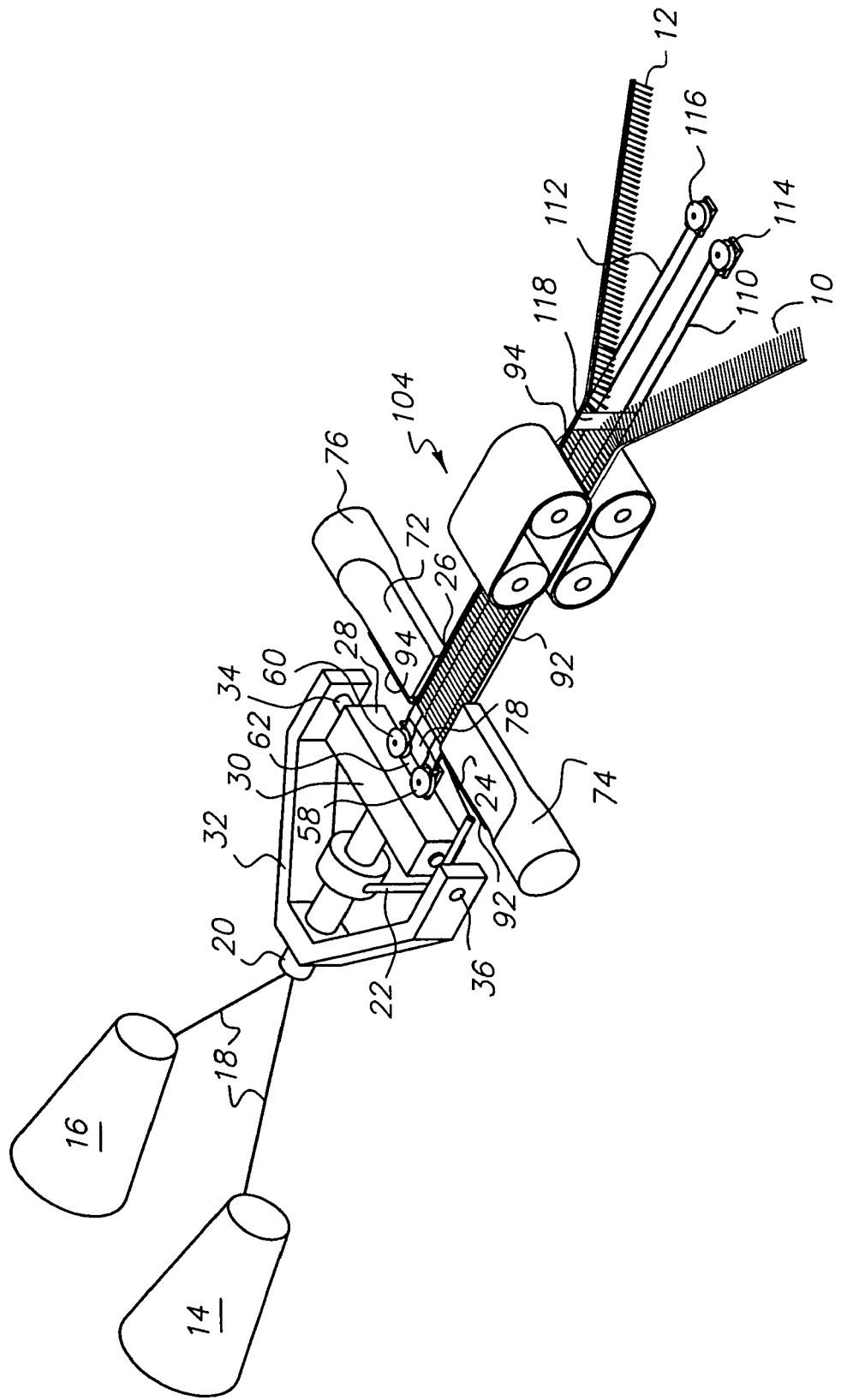
FIG. 4 is a perspective view schematically illustrating the apparatus in accordance with another embodiment of the invention utilizing a pair of wire loops to provide the winding frame in the winding station and to support the wound loops in the binding section of the apparatus.

Referring to FIG. 4, there is shown an apparatus for making weatherseals 10 and 12 by winding yarn from a spindle 22 at a winding station 28 and welding backing strips 92 and 94 to the ends of the yarn at the binding station 72. The foregoing and other like parts of the apparatus shown in FIGS. 1-3, and in FIG. 4 are designated by like reference numerals. The winding frame in the apparatus shown in FIG. 4 is provided by a pair of endless wire loops 110 and 112, preferable of metal such as stainless steel or titanium. The wire provides support for the loops as they are wound by yarn 24 drawn out from the rotating spindle 22. The loops 110 and 112 have ends around free running support rollers 114 and 116 which are mounted on shafts on brackets attached to a base provided by the frame of the machine. The opposite ends of the frame loops 110 and 112 extend around the rollers 58 and 60 on the bracket 62 attached to the stationary support 30.

The wires 110 and 112 are guided through the winding station by notches and slots in the anvil 78. The wire loops 110 and 112 extend through the center of the loops 26 via notches in the anvil similar to those shown at 84, 86, 88 and 90 in FIG. 3. The support loops 110 and 112 extend along the processing path through the loops 26 until the loops are slit by a slitter 118 located along the processing path downstream of the transport station 104.

Inasmuch as a special supply of filaments to provide the frame loops of FIGS. 1-3 in the winding and binding stations 28 and 72 are not required in the apparatus shown in FIG. 4, the apparatus is simplified. The loop 110 and 112 wire material does not bind to the yarn loops 26. The ends of the loops of yarn are ultrasonically welded together with the backing strips 92 and 94 by the welding heads 74 and 76 which bear against the strips 92 and 94, the ends of the loops 26 and the edges of the anvil 78.

A further advantage of the use of wire loops in providing a product that need not be slit is obtained with the apparatus shown in FIGS. 5, 6A or 6B and 7. There like parts to those shown in FIGS. 1 through 4 are identified with like referenced numerals.

In the apparatus shown in FIGS. 5, 6A, 6B and 7, the anvil 120 is shorter along the processing path than the anvil 62: The anvil 120, like the anvil 62, provides guidance for wire loops 122 and 124 in notches (like those in FIG. 3) along the center and edges of the anvil. These notches at the downstream end of the anvil have arcuate and particularly semi-circular shape when viewed from the top at 126 and 128 in FIGS. 6 and 6A. Alternatively, rollers 130 and 132 (see FIG. 6B) may be imbedded at the downstream end of the anvil where the wires in the loops 122 and 124 turn, as the wires extend around the ends of the loops 122 and 124.

Figure 5:
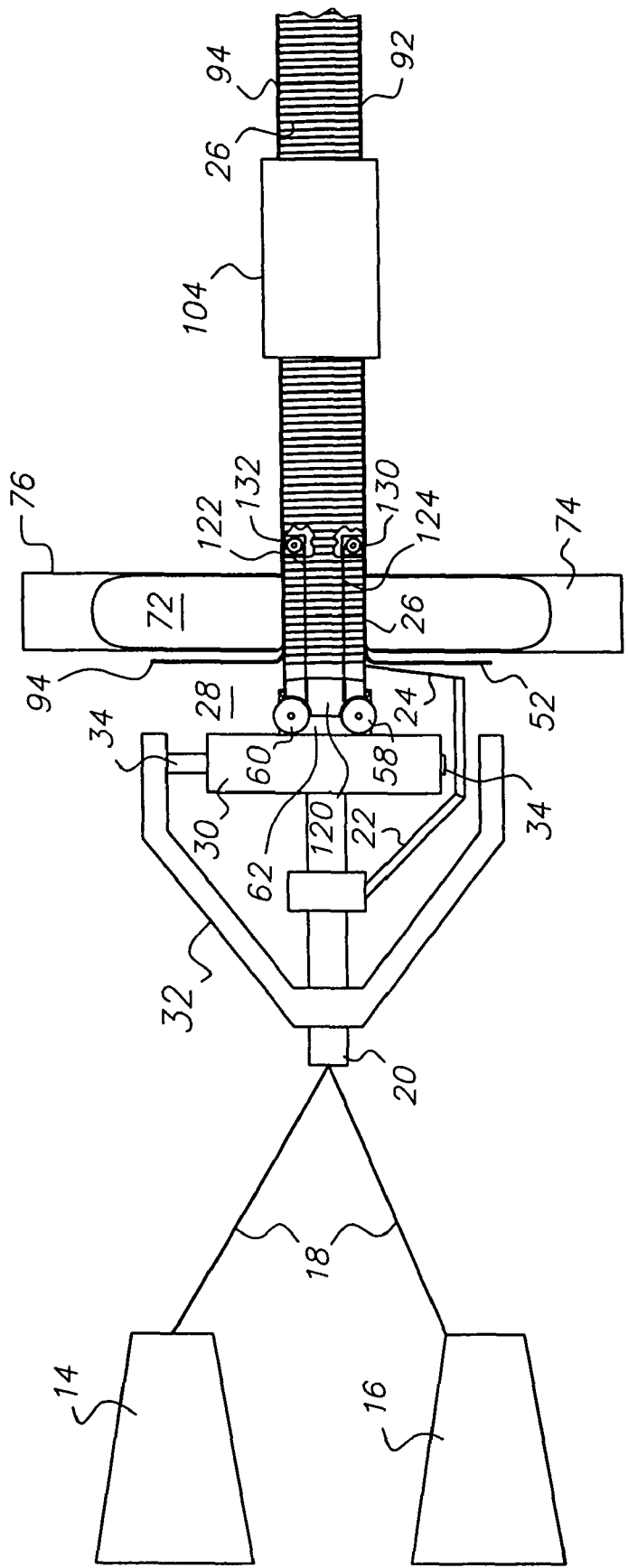
FIG. 5 is a plan view of a still further embodiment of the apparatus embodying the invention wherein the loops which define the winding station extend to a position between the binding station and the driving station and are sufficiently limited in height to enable pile made of complete loops where the loops are not slit, as in the apparatus shown in FIGS. 1 and 4.
Figure 6:
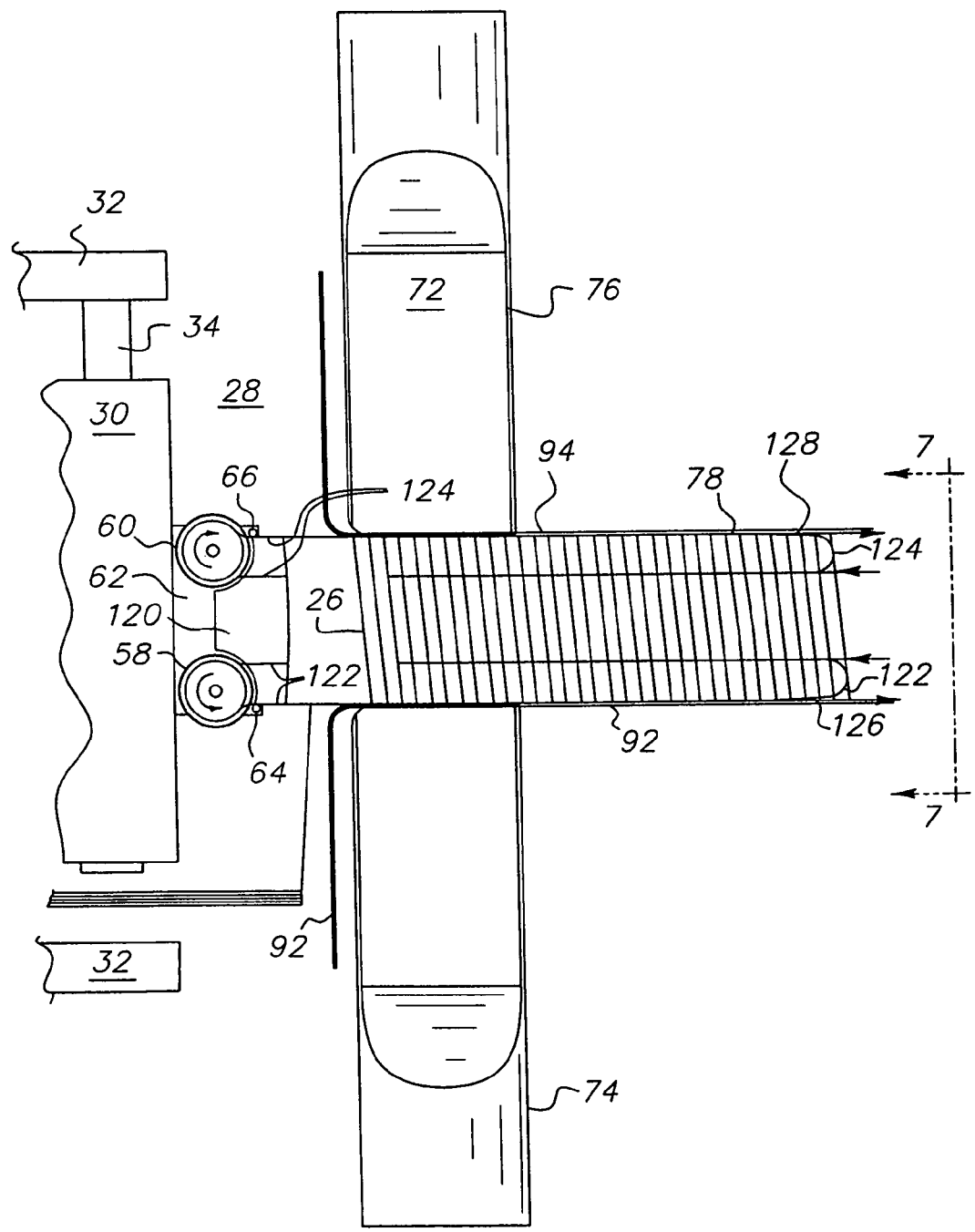
FIG. 6 is a plan view of the winding and binding stations in FIG. 5, illustrating the path of the wire loops which define the frame on which the yarn is wound.
Figure 6A:
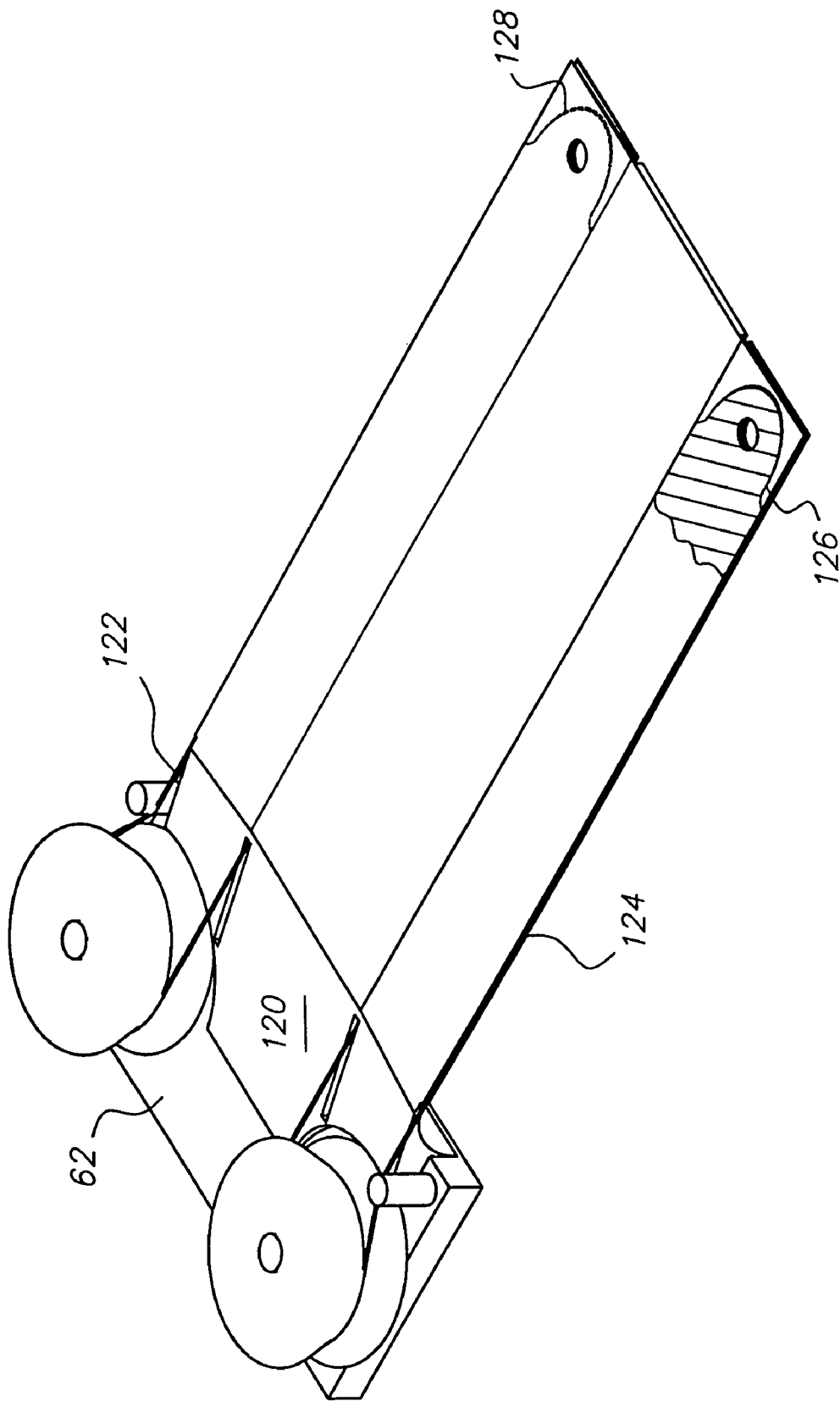
FIGS. 6A and 6B are perspective views of different mechanisms whereby the wire loops may be supported.
Figure 6B:
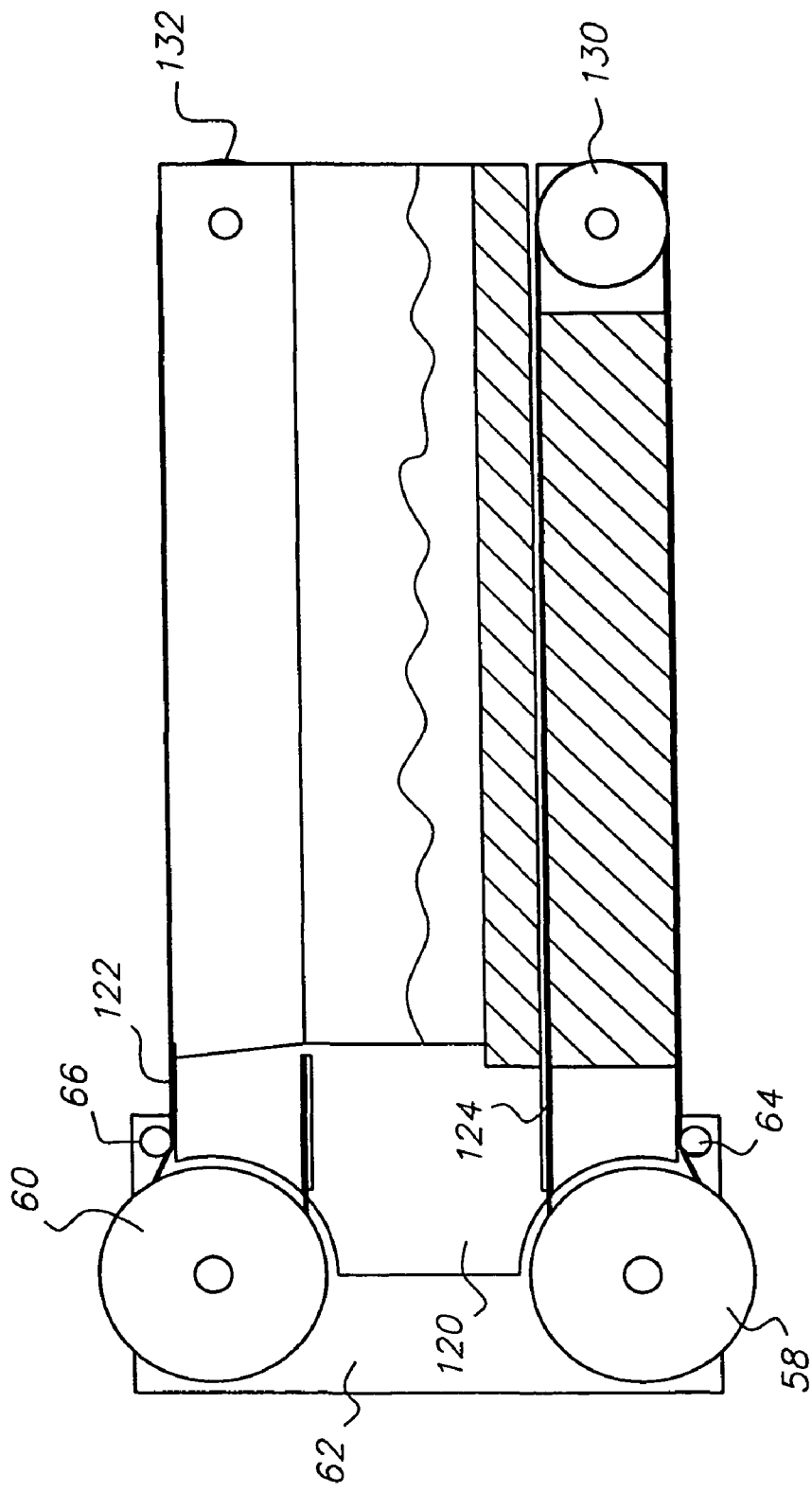
Figure 7:
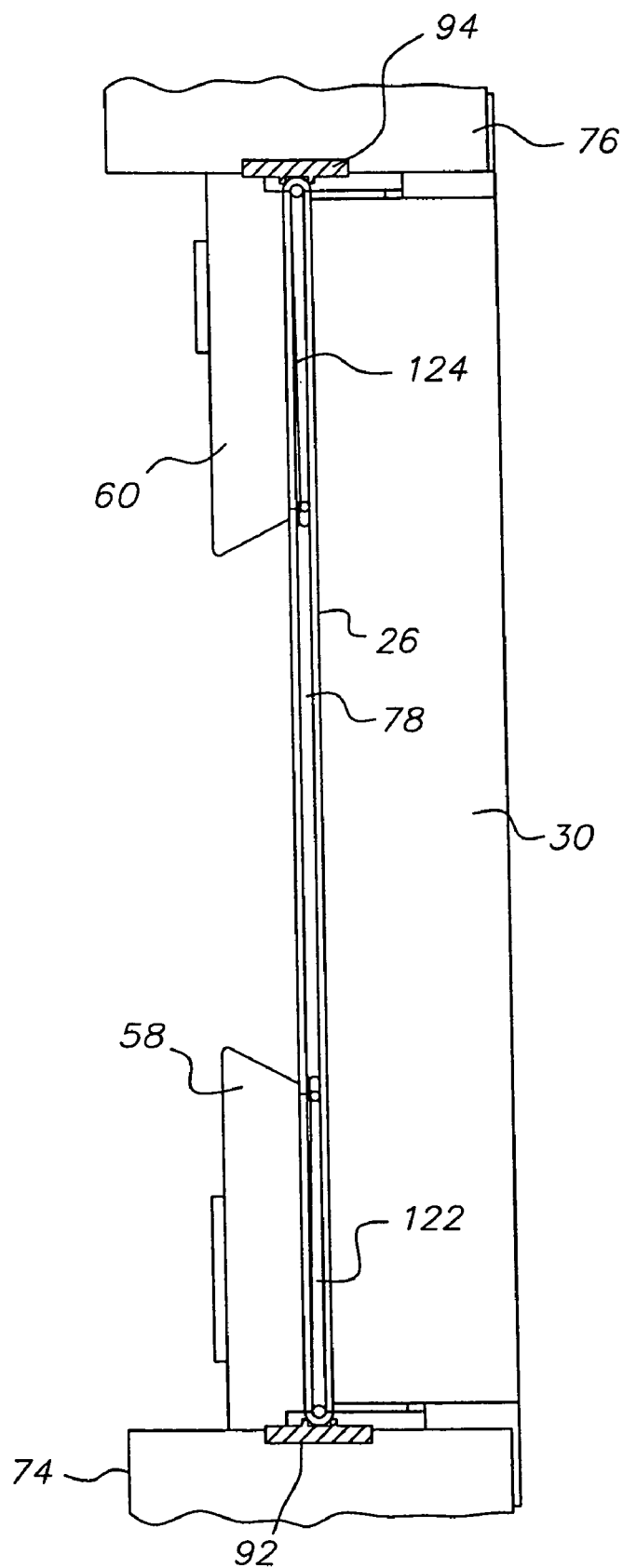
FIG. 7 is an end view along the line 7-7 in FIG. 6 illustrating the support of the downstream end of the frame forming loops.

The product produced by the apparatus shown FIGS. 5, 6 and 7 is illustrated in FIG. 15. The loops 26 of yarn provide a continuous pile having sides 140 and 142. Adjacent loops 26 are welded to each other and to the backing strips 92 and 94 at the ends of the loops. Different weatherseal and other pile articles may include the continuous loop pile articles produced by the apparatus shown in FIGS. 5 to 7. These articles may have their backing strips in generally parallel relationship as shown in FIGS. 28 to 35, 37A and 37B, or the backing strips may be spaced along side each other in edge to edge relationships to provide resilient supports and seals which are shown in FIGS. 16 to 27. The various types and applications or installations for the continuous loop pile articles as shown in FIGS. 16 through 35, 37A and 37B are discussed in greater detail hereinafter.

Figure 8:
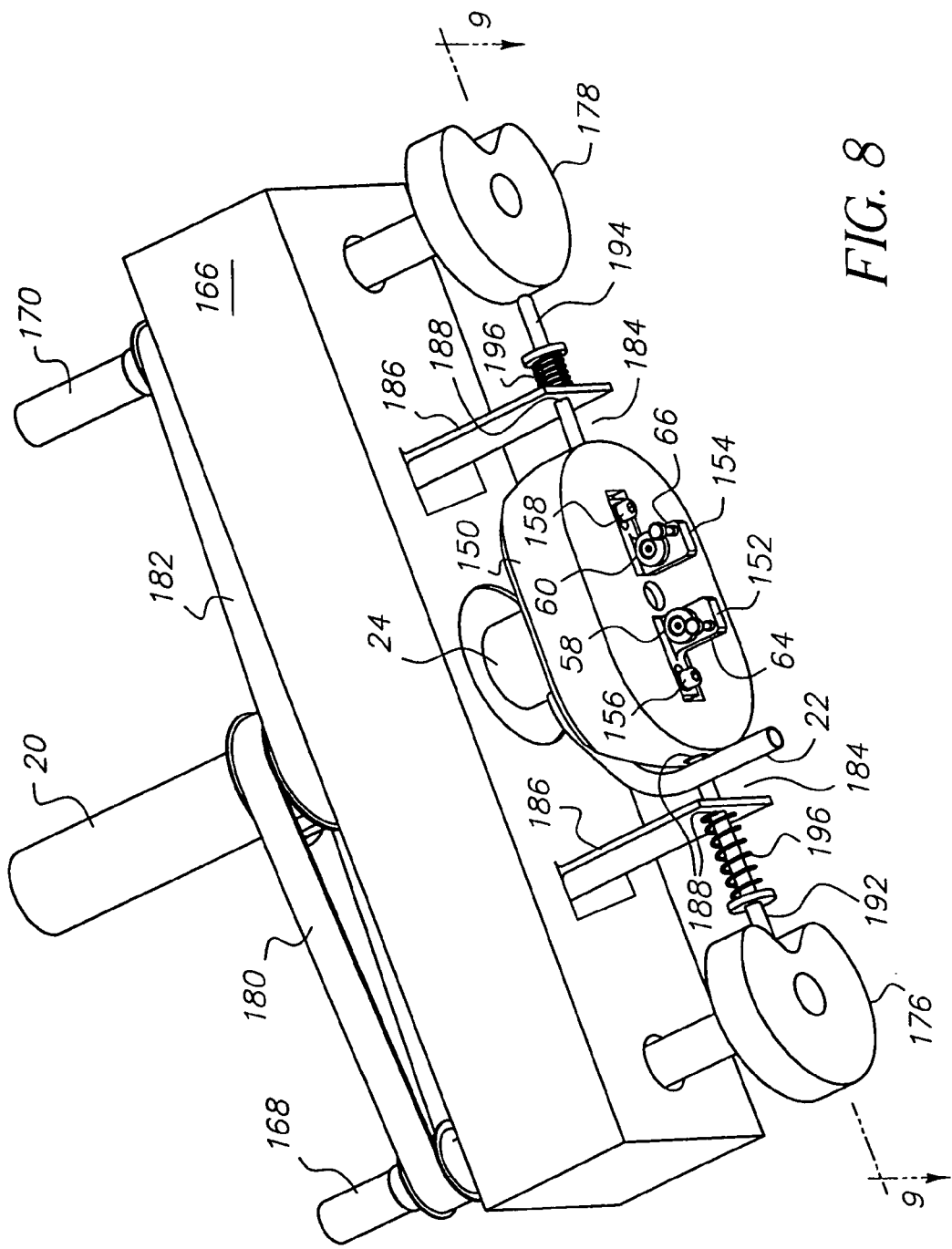
FIG. 8 is a perspective view taken from the top of the apparatus for making pile articles having mechanically operated means for maintaining the winding station stationary while the spindle wraps the yarn around the frame in the winding station.
Figure 9:
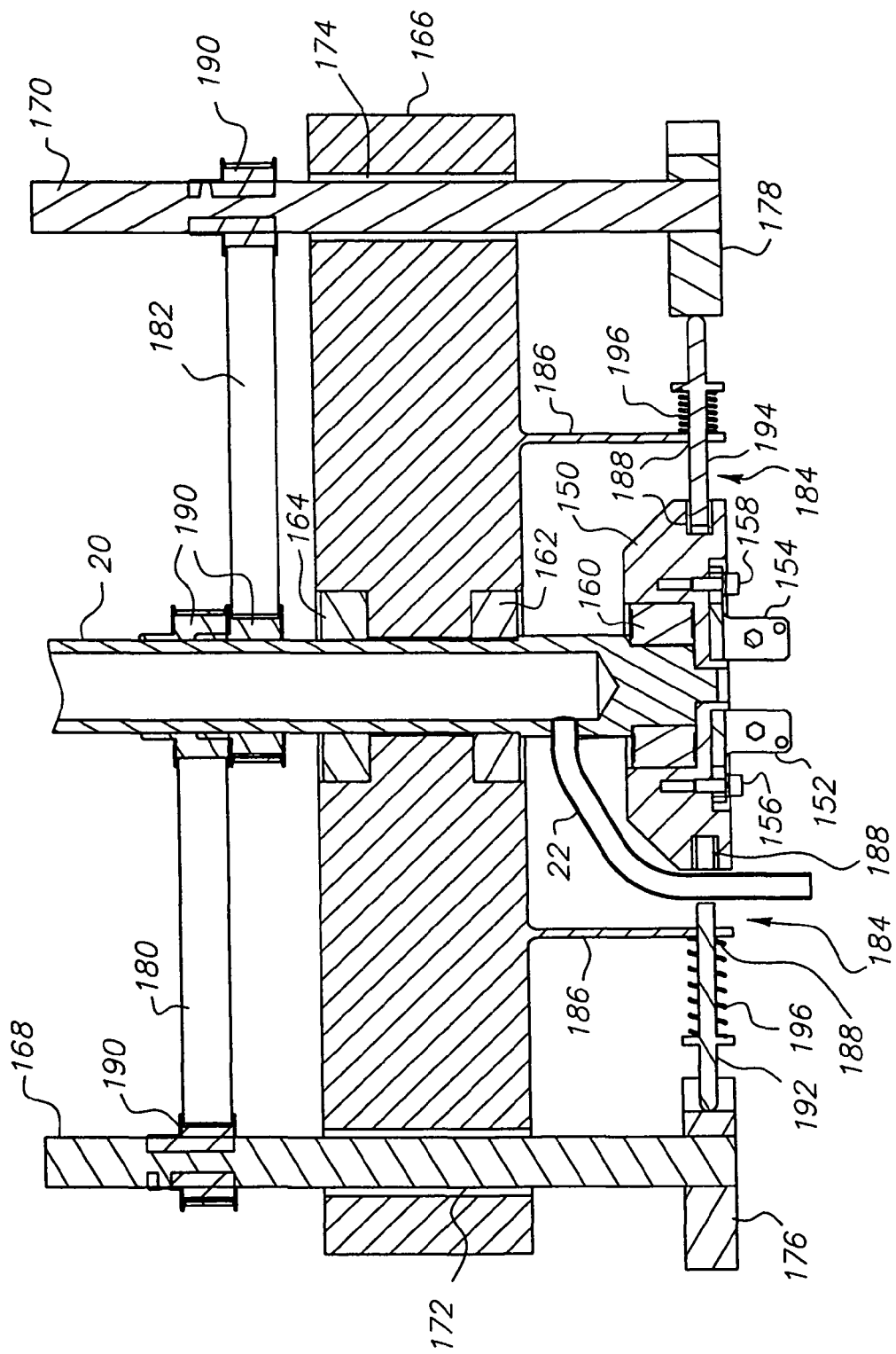
FIG. 9 is a sectional view of the mechanism shown in FIG. 8 taken along the line 9-9 and viewed in the direction of the arrows.

Referring to FIGS. 8 and 9, there is shown mechanically operative means for maintaining a support 150 which like the support 30 (carrying the scotch yoke mechanism) maintains the winding station 28 fixed or stationary. The support 150, like the support 30, provides attachment for the rollers 58 and 60 and guide pins 64 and 66 which define the upstream end of the loops forming the winding frame extend. These rollers 58 and 60 and pins 64 and 66 are attached to the support 150 by brackets 152 and 154 which are laterally adjustable on the support 150 by slot and screw arrangements 156 and 158, thereby enabling alignment of the winding loops and frame and the defining the width of the pile articles produced by the apparatus. The mechanism shown in FIGS. 8 and 9 as well as the fluid powered mechanism shown in FIGS. 10 to 12 and the magnetic chuck mechanism shown in FIGS. 13 and 14 may be used as replacements for the scotch yoke mechanism discussed in connection with FIGS. 1 through 7, and especially where the product production rate and the speed of winding of yarn at a faster rate than practical with a scotch yoke support mechanism is desired.

In the FIGS. 8 and 9 mechanism, the shaft 20 which rotates the spindle 22 via collar 24 is journalled, as by a bearing 160, in the support 150. The shaft 20 is also journalled in bearings 162 and 164 in a stationary base of guide block 166, which may be mounted on the base or frame of the apparatus. Shafts 168 and 170 are journalled in sleeves 172 and 174 through the guide block 166. Cams 176 and 178 are mounted at the ends of the shafts 168 and 170. These cams 176 and 178 are driven synchronously, with the rotation of the shaft 20 and the spindle 22 thereon, by drive belts 180 and 182 attached to pulleys 190 keyed to the shafts 20, 168 and 170.

The spindle 22 rotates through a gap 184 between the outer peripheral surface of the support 150 and fingers 186 projecting from the guide block 166. There are aligned holes 188 in the support block 150 and fingers 186.

Pins 192 and 194, guided by the holes 188 in the brackets 186, are biased against the cams 176 and 178 by springs 196 which bear against the fingers 186.

In operation, the pins 192 and 194 are reciprocated by the cams 176 and 178 into and out of the holes 188 in the support block 150. The reciprocation of the pins 192 and 194 are synchronized with the rotation of the spindle 22, by virtue of their driven relationship from the spindle drive shaft 20. Thus, the pins 192 and 194 clear the gaps 184 when the spindle enters and passes through these gaps. At other times during the cycle of rotation, except where the spindle 22 is passing through the gaps 184, one or both pins are in the holes 188 in the support block 150. The support block in maintained stationary and any torque, which may be transmitted through the bearings 160 by which the shaft 20 is journalled in the support block 150, is prevented from rotating the support block 150. Therefore, the support block 150, the winding frame provided either by loops 44 and 46, 110 and 112, or 122 and 124, and the winding station 28 are maintained stationary during yarn winding operations.

Figure 10:
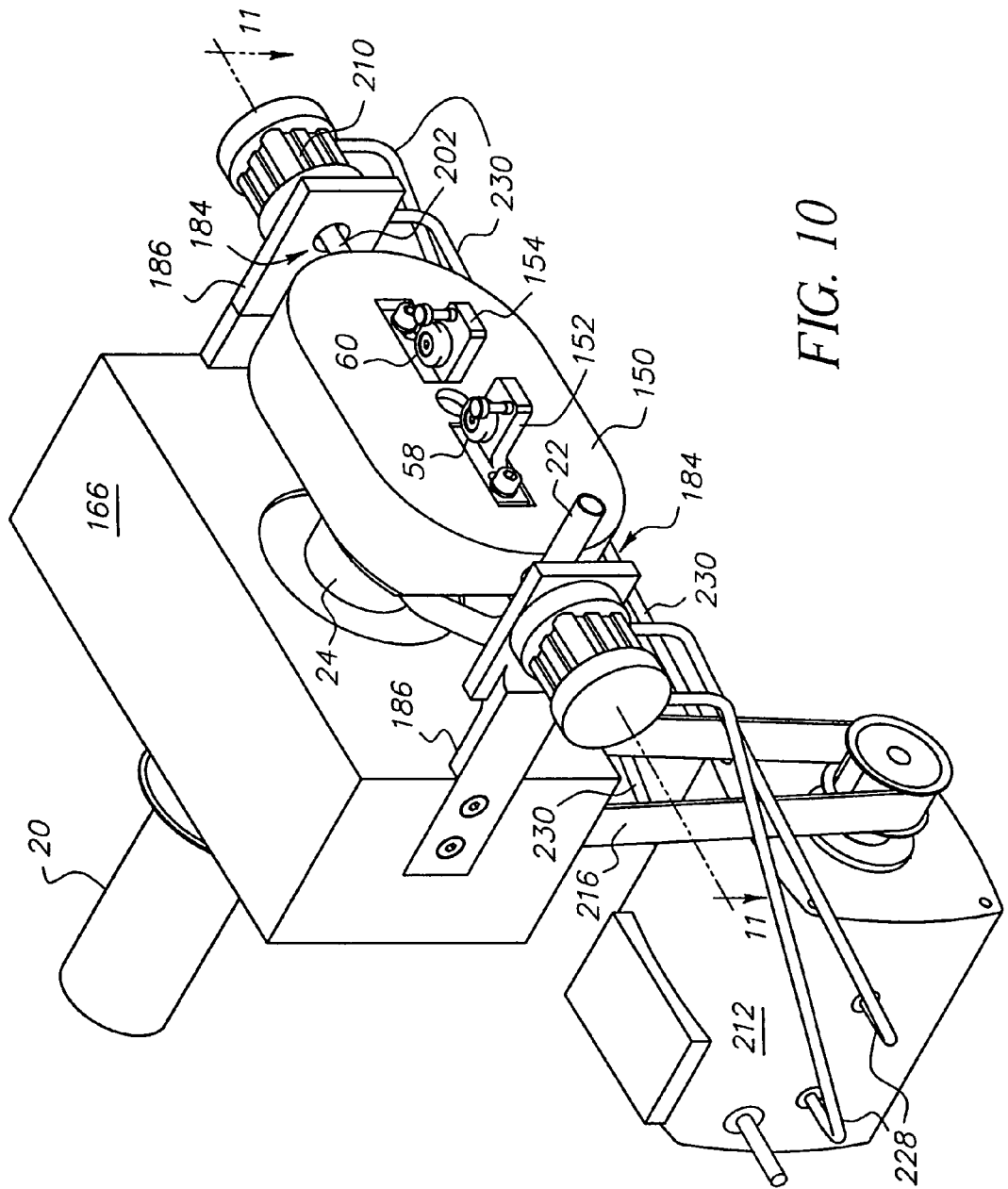
FIG. 10 is a perspective view showing mechanism for maintaining the winding station stationary which is fluid pressure operated.
Figure 11:
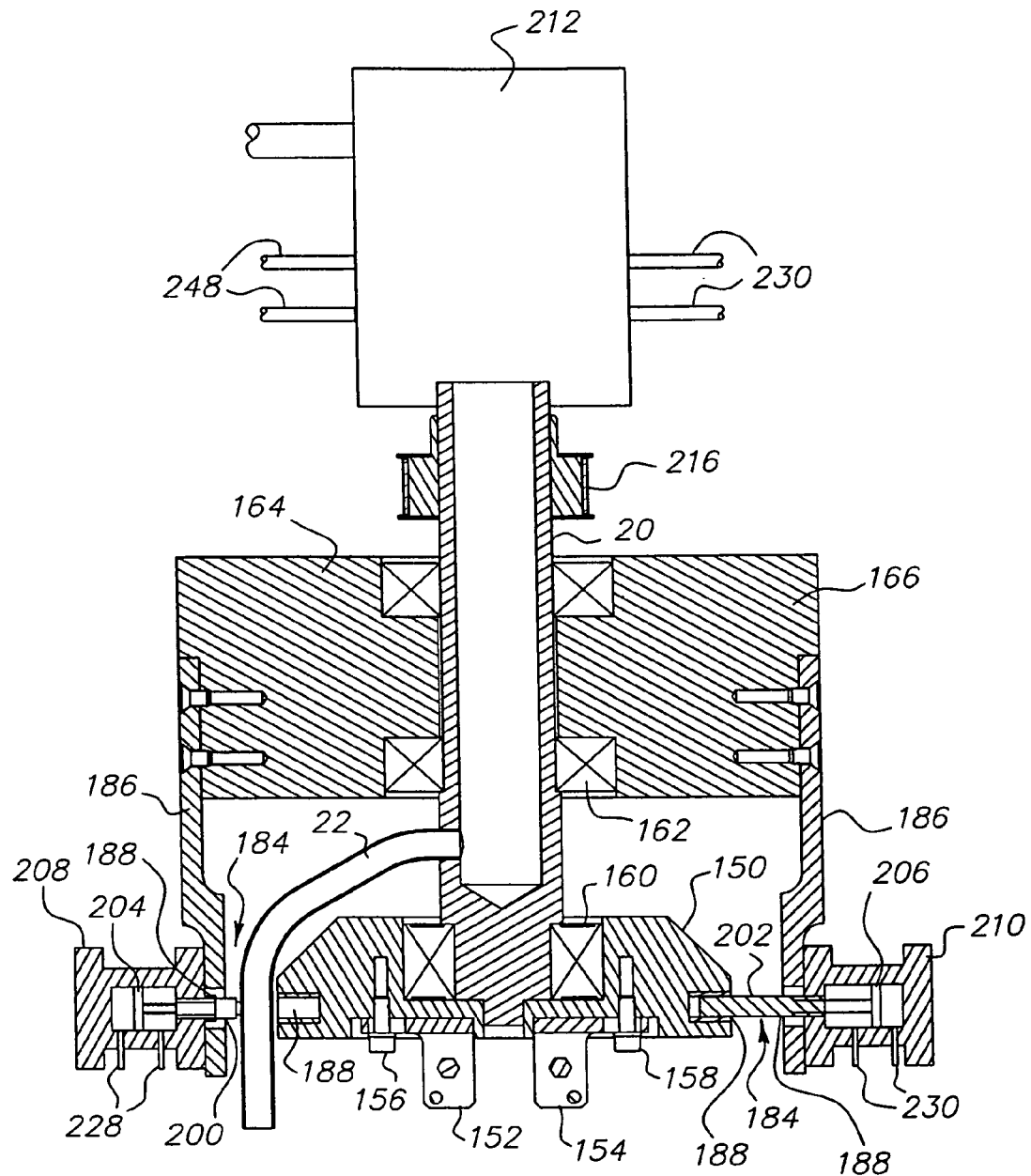
FIG. 11 is a fragmentary sectional of the mechanism taken along the line 11-11 in FIG. 10, when viewed in the direction of the arrows.
Figure 12:
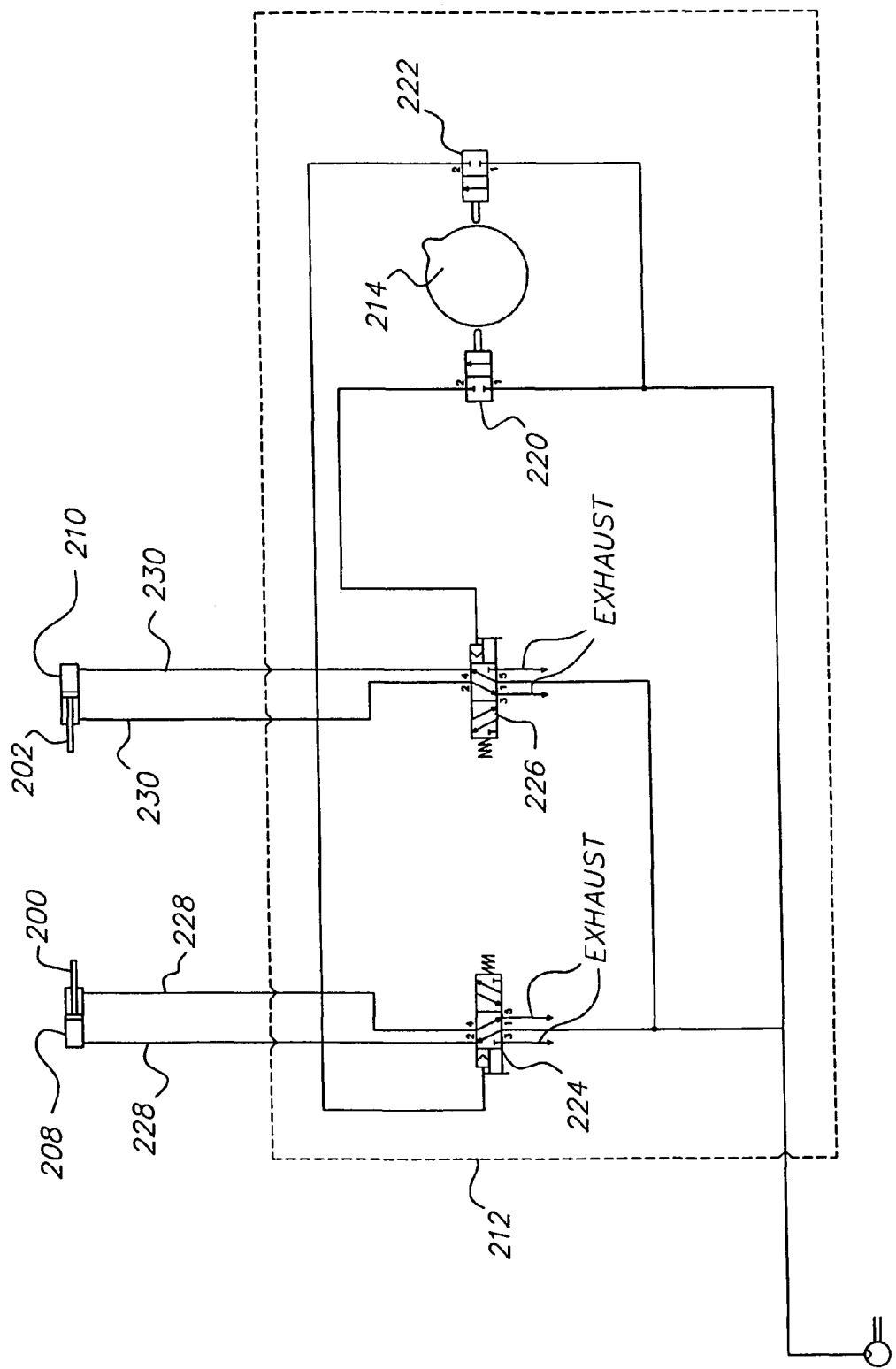
FIG. 12 is a schematic diagram of the fluid pressure circuits of the mechanism illustrated in FIGS. 10 and 11.

A fluid pressure operated mechanism, which may be pneumatically operated (or alternatively may be hydraulically operated) for maintaining the winding station stationary, is illustrated in FIGS. 10, 11 and 12. Parts which provide functions like those or parts illustrated in FIGS. 8 and 9 are designated with like referenced numerals.

Actuation of pins 200 and 202, from a base 166 which is stationary and has fingers 186 outboard of the path of the spindle 24 and the winding station support 150, is provided by pistons 204 and 206 in pneumatic cylinders 208 and 210. These cylinders are attached to the fingers 186, and drive the pins 200 and 202 which are attached to the pistons through gaps 184 reciprocally with respect to the support block 150 and particularly into the holes 188 therein. Pressurized air is switched into chambers on opposite side of the pistons 204 and 206 by a pneumatic switching circuit which is shown in FIG. 12. This circuit is contained principally in a housing 212. The housing contains a timing cam 214 driven by a belt drive 216 connected between pulleys on the shaft 20 and a shaft leading into the housing 212 which rotates the timing cam 214.

As shown in FIG. 12, a cam 214 operates control switching valves 220 and 222 which actuate four way valves 224 and 226. These valves switch the compressed air via lines 228 to the cylinder 208, and through lines 230 to the cylinder 210. The force applied to these pistons may be adjusted by varying the size of orifices (not shown) in the lines 228 and 230. The pneumatic circuit and actuators shown in FIGS. 10, 11 and 12 provide support via the pins 200 and 202 for the winding station by reciprocally moving the pins through the gaps 184 in synchronism and timed relationship with the rotation of the spindle 22. The fluid pressure operated embodiment provides operation with even less vibration than the mechanically actuated mechanism shown in FIGS. 8 and 9 and may be preferred if still higher product production and winding rates are desired.

Figure 13:
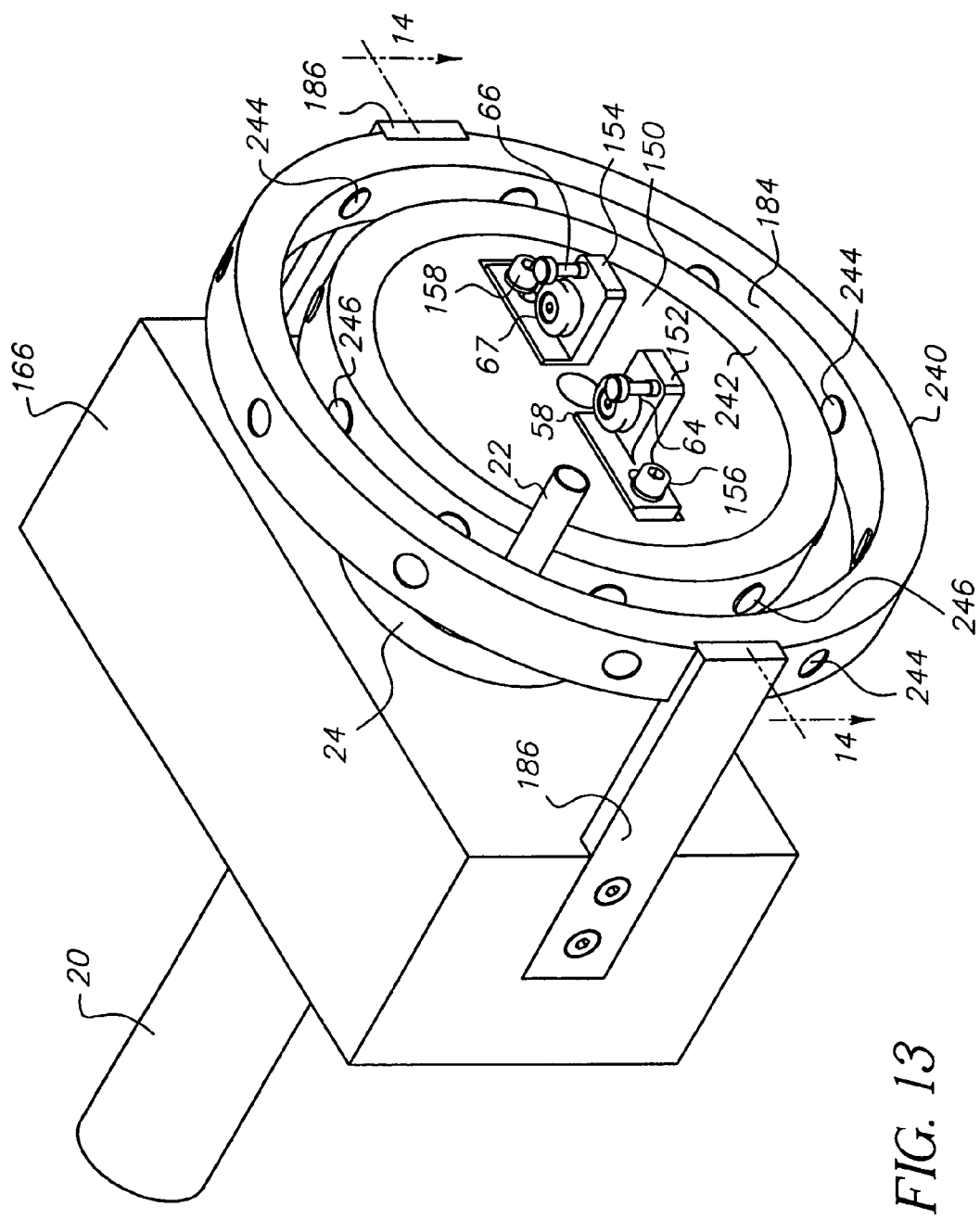
FIG. 13 is a perspective view illustrating a magnetically operating mechanism for maintaining the winding station stationary.
Figure 14:
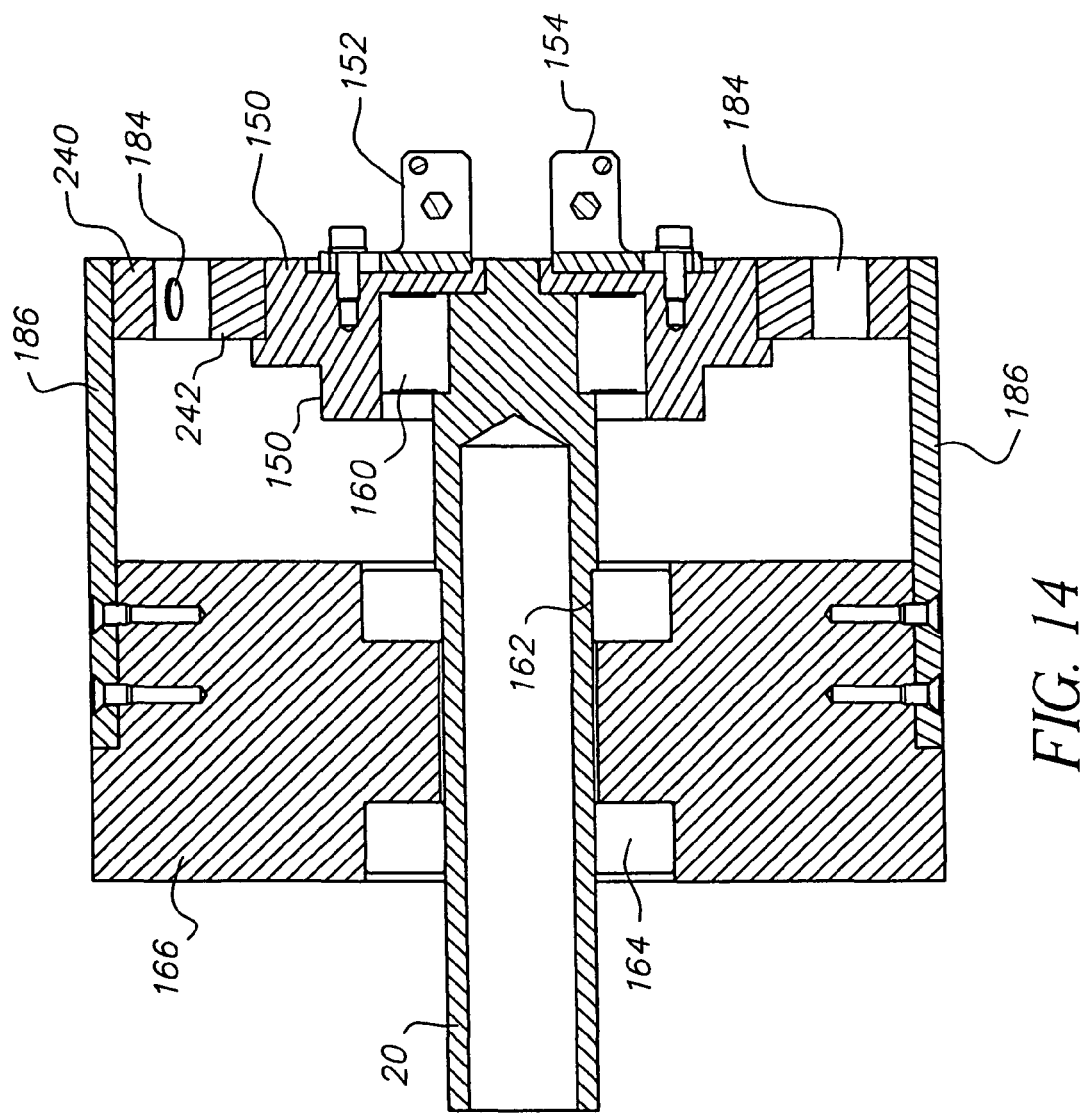
FIG. 14 is a sectional view of the mechanism shown in FIG. 13 taken along the line 14-14 in FIG. 13 when viewed in the direction of the arrows.

Referring to FIGS. 13 and 14, there is shown a cylindrical support block 150 which carries the brackets 152 and 154 and the rollers 58 and 60 and pins 64 and 66 which mount the extreme end of the winding frame of the winding station. This support block and the winding station are maintained stationary by being magnetically coupled to a stationary stator 240. The stator 240 is held stationary by the fingers 186 projecting from the stationary support block 166, which is fixed to the base or frame of the machine. An armature ring 242 is attached to the support 150. Permanent magnets 244 are spaced from each other around the stator ring 240. Permanent magnets 246 are spaced from each other around the armature 242. The spacing of the magnets 246 corresponds to the spacing of the magnets 244. The spacing is no smaller than the radial distance across the gap 184 between the armature 242 and stator 240 through which the spindle 22 rotates. The magnets 244 and 246 are polarized in the same direction so that the north and south poles line up the field generated by these magnets 244 and 246. The field, therefore, is cumulative and sufficiently strong to prevent the support block 150 from rotating as for example from torque which is transferred through the shaft bearings 160 in the support block 150. Alternatively, only one of the armature or stator may have the magnets disposed therein. In either case there is a radial magnetic field which effectively magnetically chucks and holds the support cylinder 150 stationary referenced against the stationary support block 166. Reciprocating pins and their associated mechanical or hydraulic drive mechanisms are thus no longer needed.

The spindle 22 is preferably made with non-conductive material, such as plastic, so that electric currents are not induced therein which might establish a reverse magnetic field and impede the rotation of the spindle. The advantage of the electromagnetic mechanism for supporting the winding station in stationary position is that the mechanism is entirely free of vibration and can afford still higher winding rates and product production than with the scotch yoke mechanism or the mechanisms shown in FIGS. 8 through 12.

Figure 26:
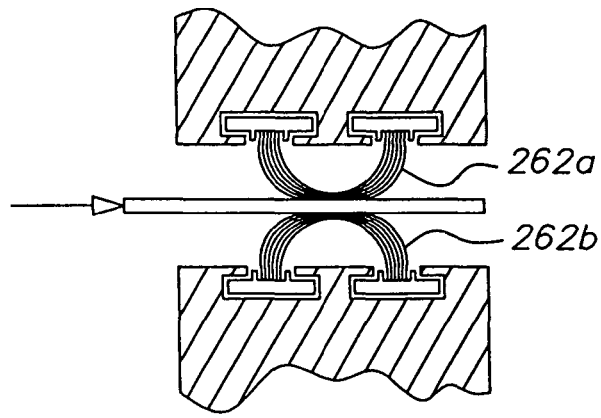
FIG. 26 is a sectional view schematically illustrating the use of pile articles similar to those shown in FIG. 16, 17 or 18 and particularly the pile articles in FIG. 18 as seal for a moving medium, such as paper, the installation providing an electrostatic discharge device for electric charges collected on the medium.
Figure 27:
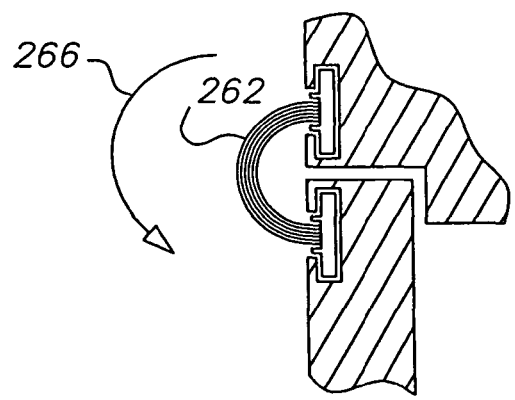
FIG. 27 is a sectional view schematically illustrating a pile article shown in FIG. 18 used as a hinge for a screen door or panel.

Reference is now made to FIGS. 16 through 27 and 37 which show the pile articles used as weatherseals and other devices for example used as electrostatic discharge devices (FIGS. 25 and 26) or as a hinge (FIG. 27). In the pile article of FIGS. 16 through 27, the continuous loop pile 26 is formed into a bow or arch which can provide a support surface. If desired, a layer of fin material, such as polypropylene sheet material may be arranged inside or outside of the pile to act as a further air and water infiltration seal. The manner in which such fins may be provided may be similar to what is illustrated in the Johnson et al. patent referenced above, and in FIG. 36.

Referring to FIG. 36, the rollers 58A and 60A of the winding station 28 are similar to the rollers 58 and 60 shown in FIG. 1. These rollers 58A and 60A are lengthened so that they carry not only the winding frame filaments 44 and 46, but also bands 125 and 127 of fin material which overlay the winding frame loops 44 and 46. The bands 125 and 127 are folded so as to have underlying parts 129 and 131 and overlying parts 133 and 135. The underlying parts 129 and 131 are located with their edges adjacent the ends of the loops 26 of yarn as the loops are wound around the frame by the rotating spindle 22. The overlying parts 133 and 135 of the bands are spaced inwardly of the side edges of the lower bands 129 and 131. The overlying parts 133 and 135 move in the direction of the arrow 141; while the underlying parts 129 and 132 move in the direction of the arrows 143 and 145. The overlying parts 133 and 135 may be pulled from reels of the fin material bands much like the filaments 35 and 38 of filamentary material which provide the winding frame loops 44 and 46.

When the loops reach the binding station 72, the lower most 129 and 131 of the band are welded to the loops of yarn 26 and the outer sides 54 and 56 of the winding frame filaments. The connection of the bands 125 and 127 provided by the welding thereof enables the lower band to be pulled by the transport station. The upper most part 133 and 135 of the bands 125 and 127 are free to move through the binding station and through the loops 26 of yarn so that additional length of band 125 and 127 may be pulled from the supply wheel thereof.

In FIG. 16, the backing strips 92 and 94 are attached by double-sided tape strips 260 to a door or window to provide a resilient bow weatherseal 262. The weatherseal may be attached to a door edge which bears against the edge of a door or a fixed panel as shown in FIG. 16A and provides a sliding weatherseal. As shown in FIG. 16B, a pair of such bow or arch weatherseals 262a and 262b may be applied to a pair of doors such as French doors and form a seal therebetween.

Figure 17A:
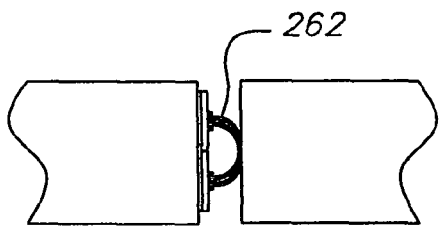
FIGS. 17A and 17B are views similar to FIGS. 16A and 16B showing installations of the pile article as a weatherseal.
Figure 17:
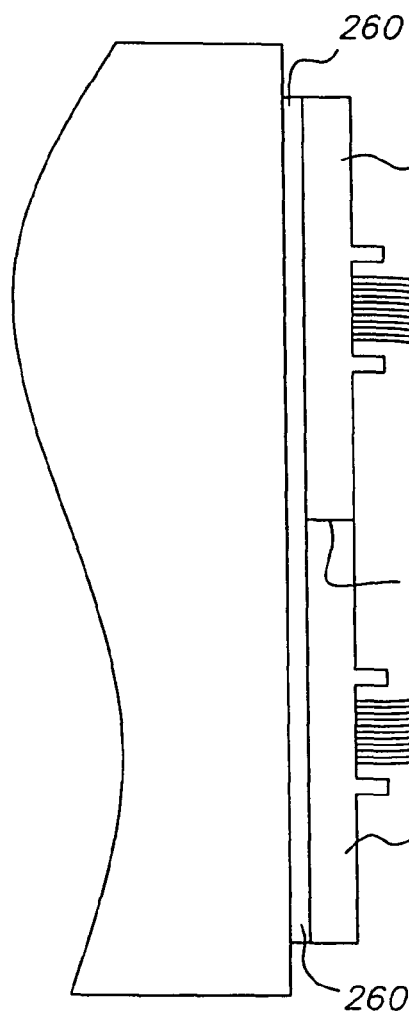
FIG. 17 is a sectional view illustrating the installation of the pile article shown in FIG. 15 where the backings are joined together.
Figure 17B:
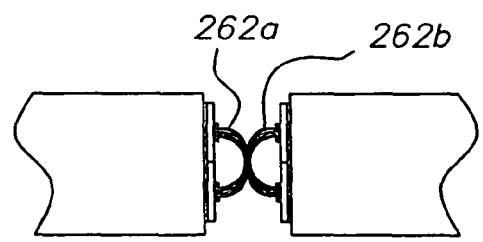

FIGS. 17, 17A and 17B are similar to FIGS. 16, 16a and 16b respectively, except that the adjacent edges of the backing strips 92 and 94 are joined preferably by an ultrasonically welded joint 271. It will be apparent from FIGS. 16 and 17 that the height of the bow or arch of weatherseal 262, 262a or 262b may be adjusted by the spacing of the backing strips 92 and 94 from each other.

Figures 18, 18A, 18B:
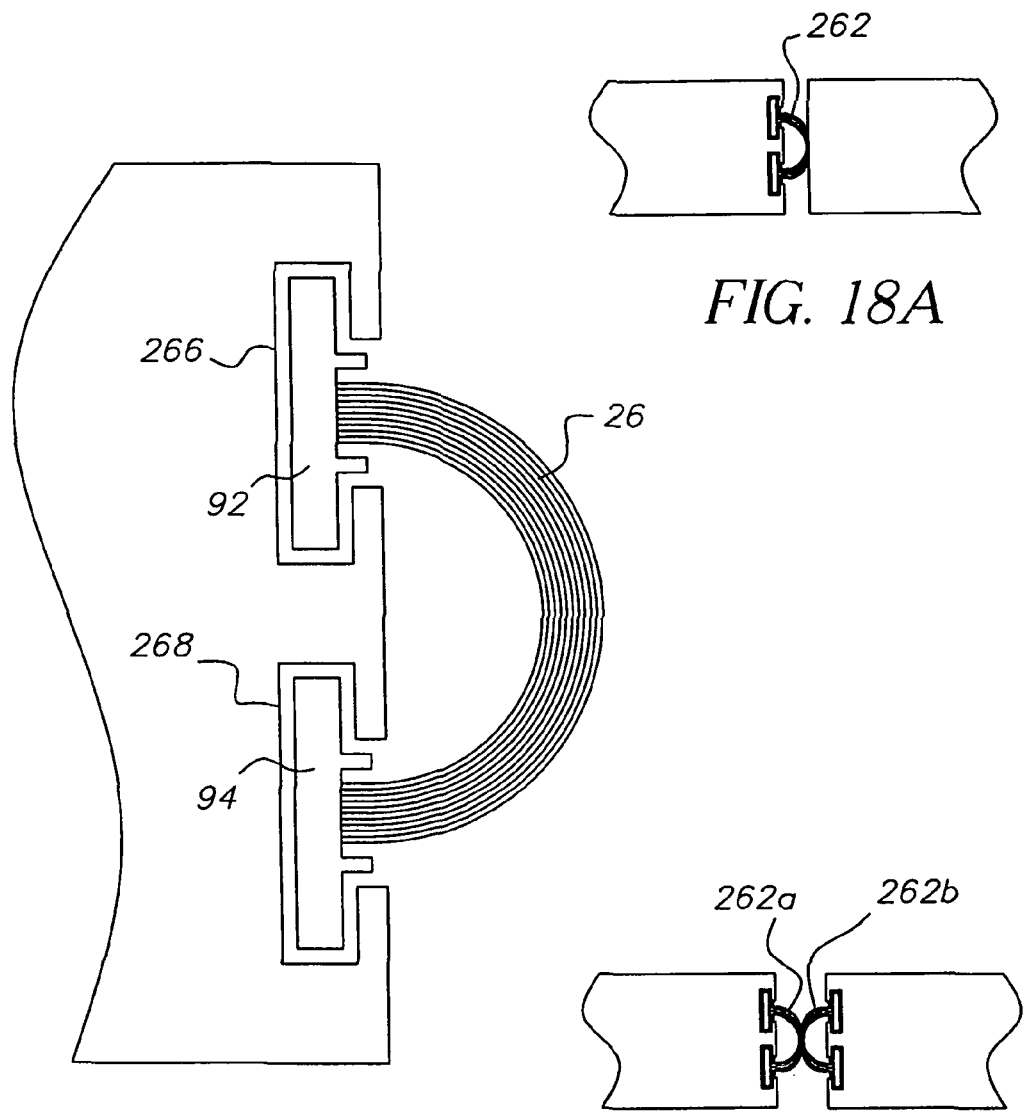
FIG. 18 illustrates a pile article shown in FIG. 15 configured for installation in T-slots of a frame.
FIGS. 18A and 18B are views similar to FIGS. 16A and 16B showing applications of the article illustrated in FIG. 18 as weatherseals for doors or panels.

FIGS. 18A, 18B and 18C are similar to FIGS. 16, 16a and 16b respectively, except that the backing strips 92 and 94 are retained in T-slots 266 and 268. Such T-slots are similar to those used to retain cut pile weatherstrips.

Figure 19:
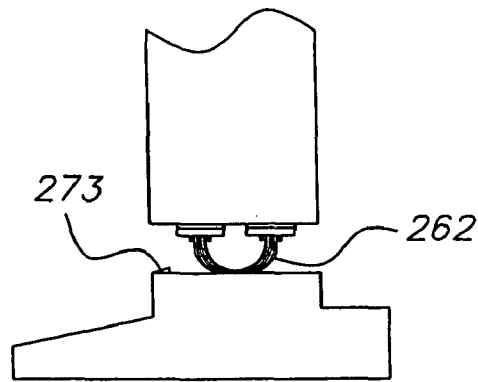
FIG. 19 is a sectional view illustrating the installation of a continuous loop pile article such as shown in FIG. 16, 17 or 18 providing a door sweep.

FIG. 19 illustrates an arrangement of the bow or arch provided by the continuous loops or double-sided loops of pile 26 which provides a sliding seal or a door sweep against a threshold 273 by being attached at the bottom of a door.

Figure 20:
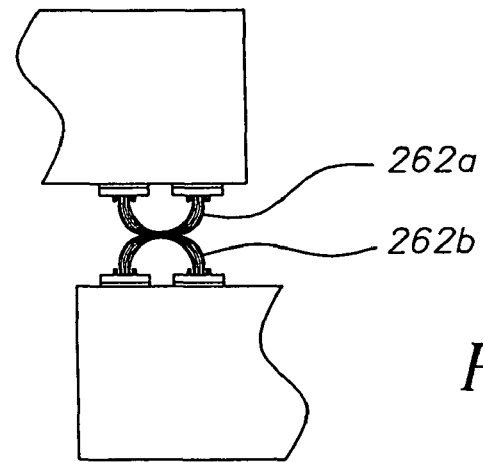
FIG. 20 is a sectional view illustrating another installation of a pair of pile articles such as shown in FIG. 16, 17 or 18 to provide weatherseals for door panels which can swing inwardly and outwardly into closing and opening relationships.

FIG. 20 shows the bow or arch weatherseals 262a and 262b providing sliding seals which space and support doors which either swing toward each other or slide with respect to each other.

Figure 21:
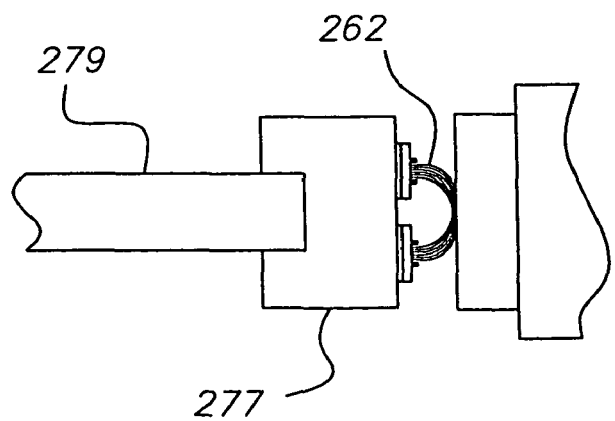
FIG. 21 is a sectional view schematically illustrating a pile article as shown in FIG. 16, 17 or 18 used as a sliding weatherseal.
Figure 22:
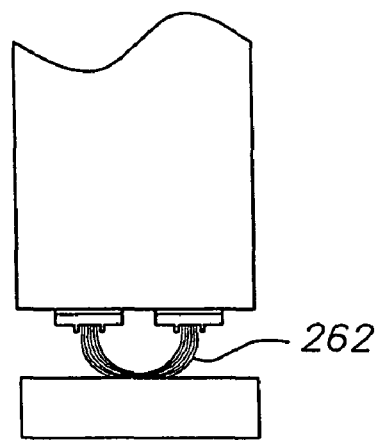
FIG. 22 is a sectional view schematically illustrating the installation of a pile article as shown in FIG. 16, 17 or 18 as a compression seal on a sash which closes against a sill.
Figure 23:
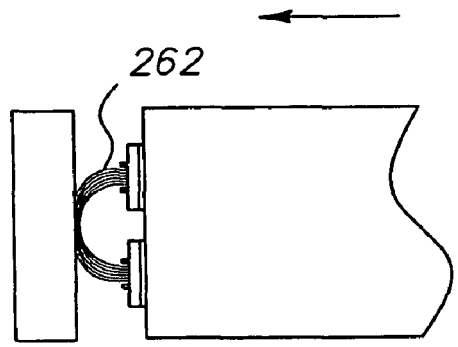
FIG. 23 is a sectional view schematically illustrating a pile article such as shown in FIG. 16, 17 or 18 providing a sliding door seal.

FIG. 21 illustrates the bow or arch of the full loop weatherseal 262 attached to the frame (style) 277 of a plate glass door 279 and provides a seal against the frame of the door. The bow or arch weatherseal 262 provides support and a seal between a sash or a door which moves vertically with respect to a sill or laterally with respect to the frame in which the door is mounted when the door slides against the frame (see FIGS. 22 and 23). If the door swings over a threshold, the arch of the weatherseal on the bottom of the door sweeps the threshold, thereby providing an improved door sweep.

Figure 24:
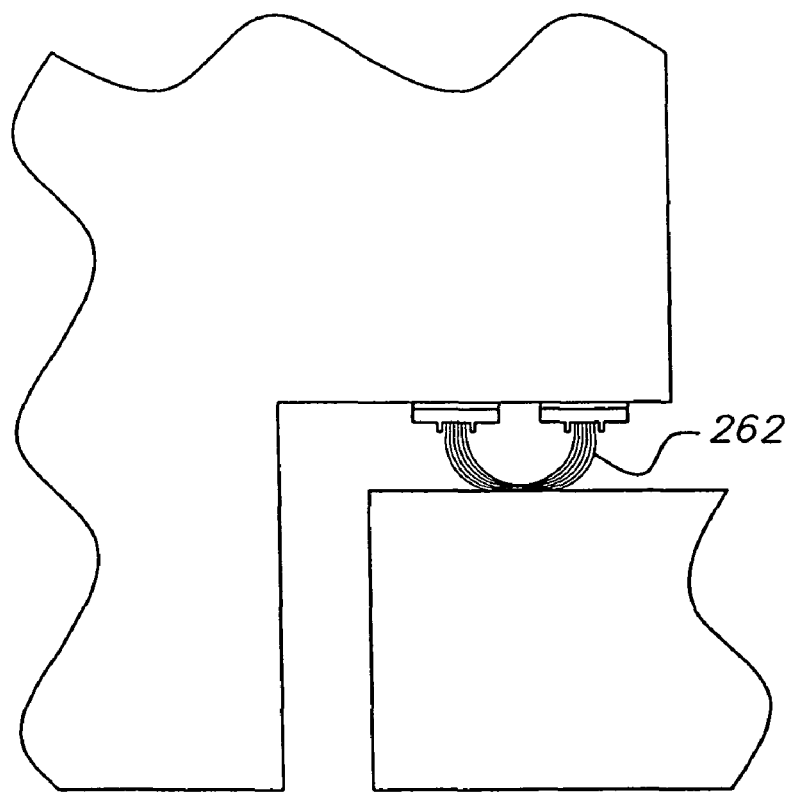
FIG. 24 is a sectional view schematically illustrating a continuous loop article such as shown in FIG. 16, 17 or 18 providing a seal in a frame against a swinging door or sash.

FIG. 24 illustrates the full loop bow or arch weatherseal 262 arranged as a compression seal when a door or sash 281 swings and bears against the bow or arch of the weatherseal. The advantages of such a sealing arrangement is low closing force, durability, reduction of air or water infiltration, and to present a wide sealing area.

Referring to FIGS. 37A and 37B there is shown a full loop weatherstrip 262 configured to bridge an angle, for example formed by the corner of a doorframe 269, as shown in FIG. 37B. The backings are disposed to define the angle which is to be bridged by the bow or arch weatherseal 262. In the case of a corner of a framework 269, the backings 92 and 94 are perpendicular to each other and may be disposed in T-slots 266 and 268. See FIG. 16 for the attachment of the backings 92 and 94 via double-sided tape 260.

As shown in FIG. 37B when a sash 271 of the window is brought down into the corner of the framework 269, the bow or arch of the full loop pile article 262 provides a resilient base and a weatherseal at the corner of the sash 271.

Figure 25:
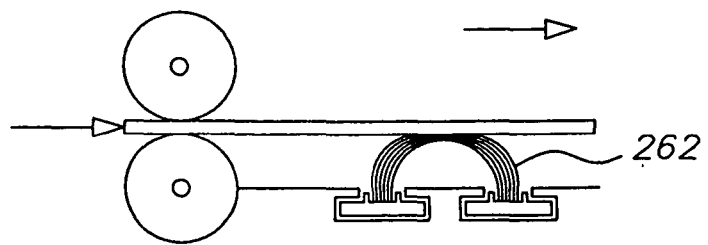
FIG. 25 is a sectional view schematically illustrating the installation of a pile article where the pile is made of conductive yarn as a electrostatic discharge device.

FIGS. 25 and 26 illustrate full loop bow or pile articles arch weatherseals 262, arranged in T-slots, providing electrical static discharged devices. The yarn in these devices 262 and 262a and 262b may be of conductive material, such as by being impregnated with copper sulfate. Charges on paper or other medium, which is engaged by the bow or arch of these devices 262, 262a and 262b, is discharged through the devices into the frame in which the device are installed. The devices can be used to provide electrostatic seals which may be used to seal against electromagnetic interference into or out of a housing. The advantages of such seals are large sealing area to provide a complete electromagnetic seal, ease of installation, low cost, durability and the ability to reduce noise or vibration or interference with the movement of the medium (the paper) past the discharge device.

FIG. 27 shows a hinge mechanism using bow or arch 262 with its backing strips in T-slots in a frame and in a door, a panel or a screen, which may be pivoted in the direction of the arrow 266. Bow or arch 262 may provide hinges at spaced positions or along the pivotal joint between the frame and the door panel or screen.

Figure 28:
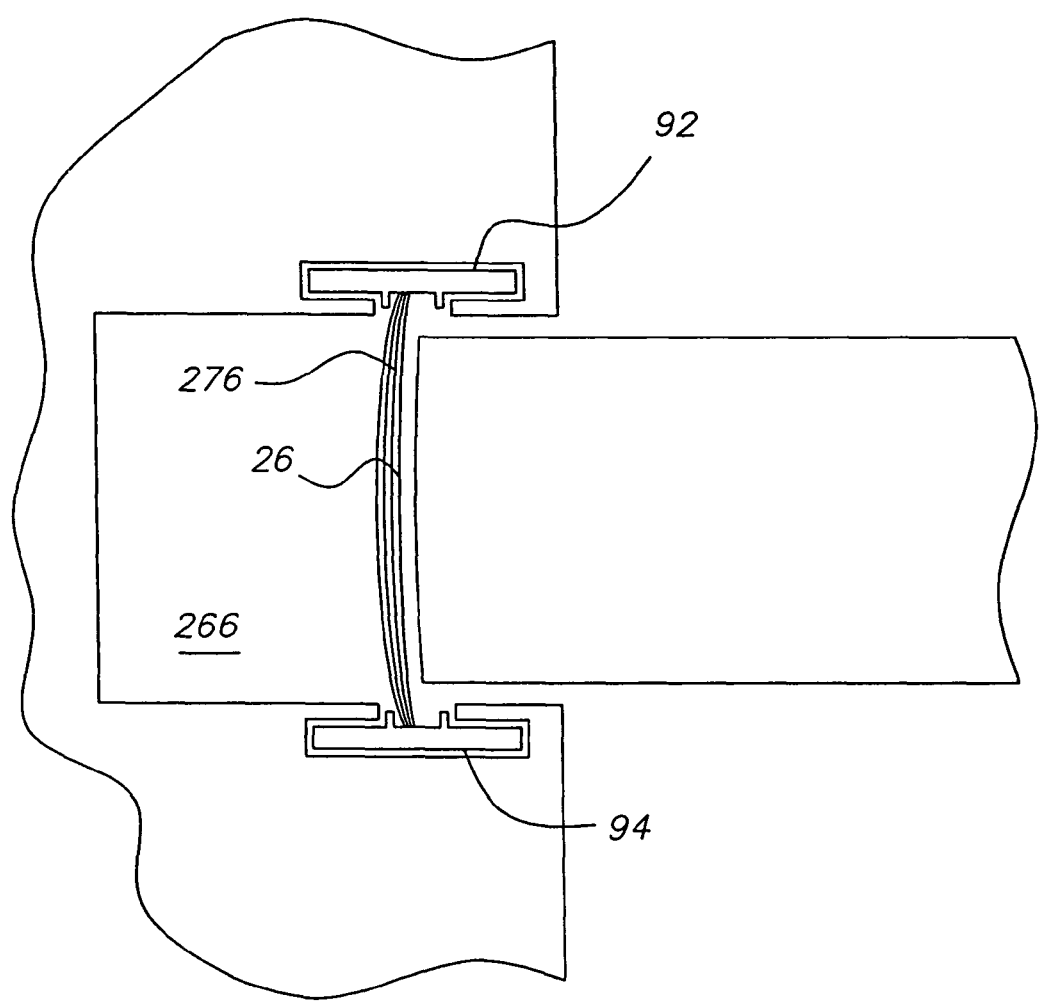
FIG. 28 is a sectional view schematically illustrating the installation of a pile article, such as shown in FIG. 15, in a frame to provide a guide strip and seal for the end of a panel which moves along the loop of pile in a directional perpendicular to the plane of the drawing.

FIG. 28 shows a device 276 similar to the weatherseal shown in FIG. 15 wherein the backing strips 92 and 94 are spaced from each other on opposite sides of a slot 266 across which the continuous loops 26 extend. The continuous loop device 276 provides a guide strip and seal for a panel which extends into the slot 266 in the frame. The device 276 advantageously reduces vibration, positions the panel, and provides a coefficient of sliding friction which enhances sliding movement of the panel along the device 276. A fin on the inside or outside of the loops may be provided to enhance air and water tightness of the loops.

Figure 29:
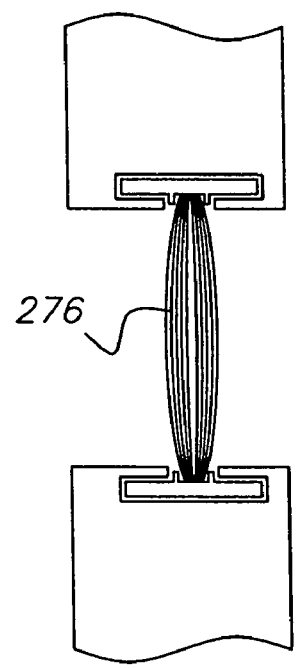
FIG. 29 is a sectional view schematically illustrating the use of a continuous pile article for providing a seal between panels.

FIG. 29 illustrates the device 276 installed between spaced panels to provide a continuous seal for sealing the space between the panels.

Figure 30:
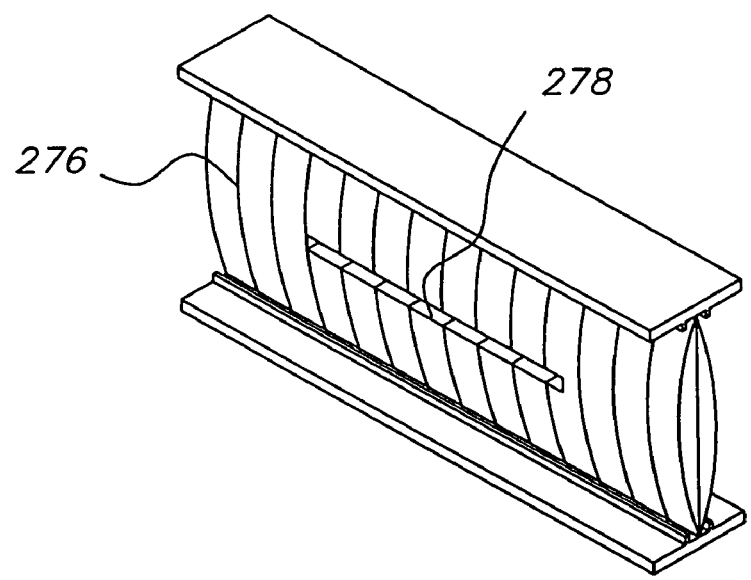
FIG. 30 is a perspective view of the pile article seals shown in FIG. 29 having a slot therethrough through which items may pass, the seal acting as a light dust or dirt seal around the item in or passing through the slot or if the pile is conductive as to facilitate discharge of static collected on the items.

FIG. 30 shows the same device as in FIG. 29 but having a slit 278 extending laterally through the loops. The slit provides a passageway for objects and enables the seal to be maintained. Thus, the seal acts as a light dust and dirt seal to prevent objects from entering an area that is sensitive to light dust or dirt.

Figure 31:
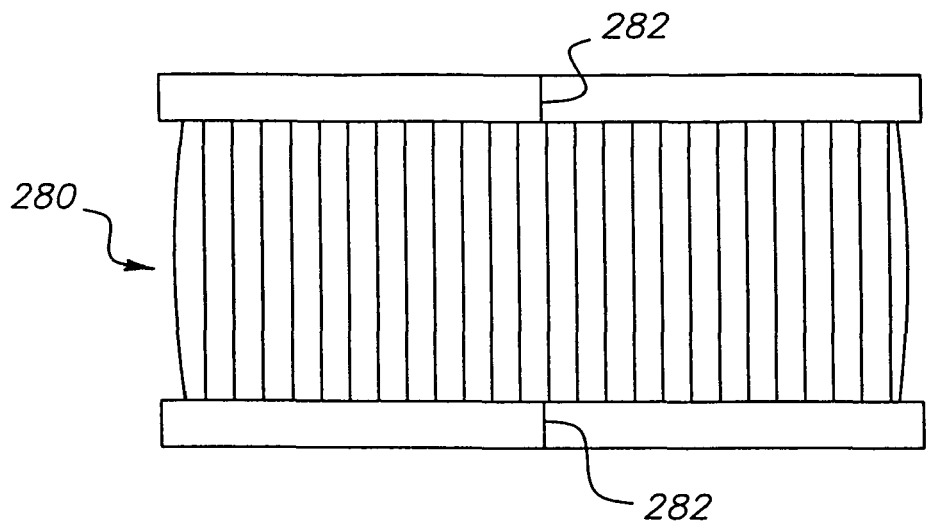
FIG. 31 is an elevational view of a circular ring formed by a pile article, such as shown in FIG. 15, which provides a spring having resiliency for supporting loads applied in a direction along the loops of yarn in the pile.
Figure 32:
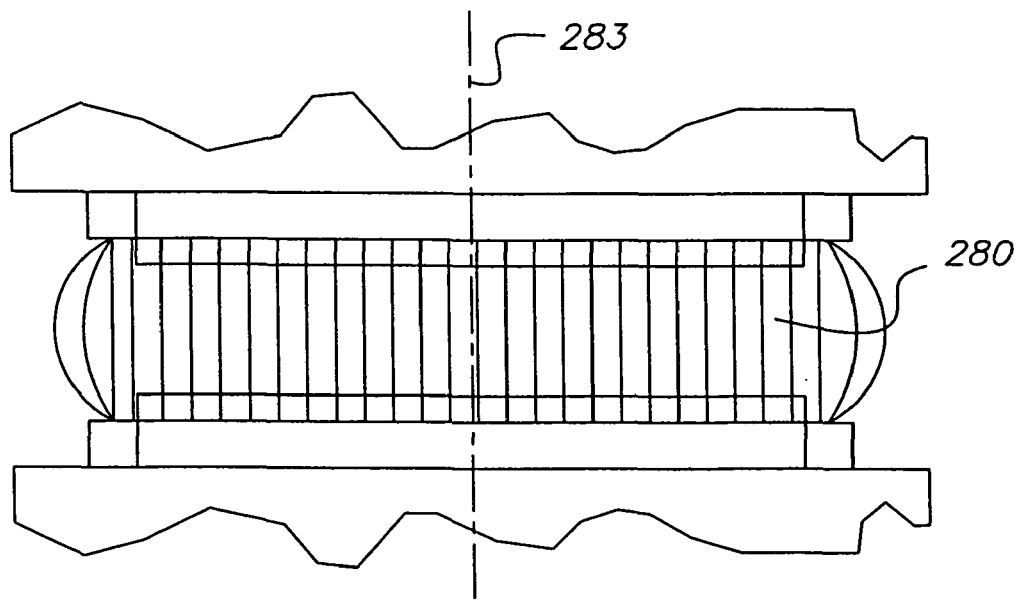
FIG. 32 is an end view showing the spring illustrated in FIG. 31 in operation.

FIGS. 31 and 32 illustrate how a ring may be formed from a continuous length of pile loop to provide a ring shaped spring mechanism 280. The axis 283 of the ring is generally through the center thereof. The pile or loop may be made in two parts each semicircular and welded at the backing strip ends to provide joints 282 on opposite sides of the structure.

FIG. 32 illustrates how the structure of mechanism 280 compresses and expands laterally in response a movable load applied thereto in a direction against a fixed surface.

Figure 33:
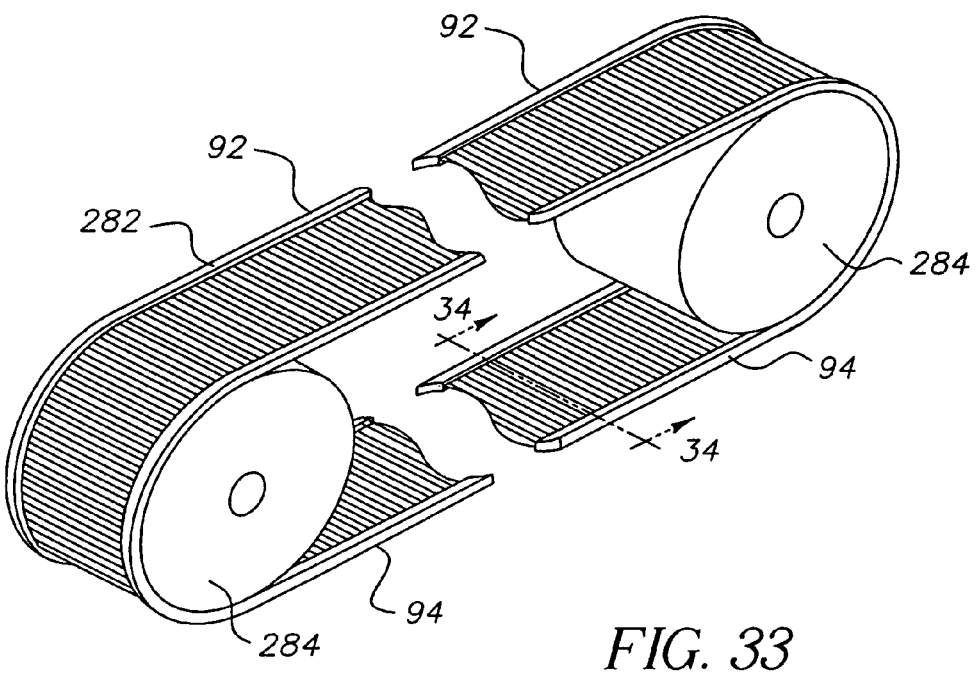
FIG. 33 is a perspective view schematically showing a pile article similar to the article illustrated in FIG. 15 configured in a loop around pulleys so as to provide a flexible belt which may serve as a conveyor.
Figure 34:
FIG. 34 is a sectional view taken along line 34-34 in FIG. 33 when viewed in the direction of the arrows.

FIGS. 33 and 34 illustrates the continuous pile loop of FIG. 15 providing a belt 282. The backing may be made of flexible material so as to engage pulleys 284, one of which may be driven. The belt may be used as a drive belt to transfer rotary motion from one pulley to the other, or as a conveyor belt for items placed on the surface presented by the loops between the backing strips 92 and 94. The conveyor provides a resilient surface for supporting objects to be conveyed.

Figure 35A:
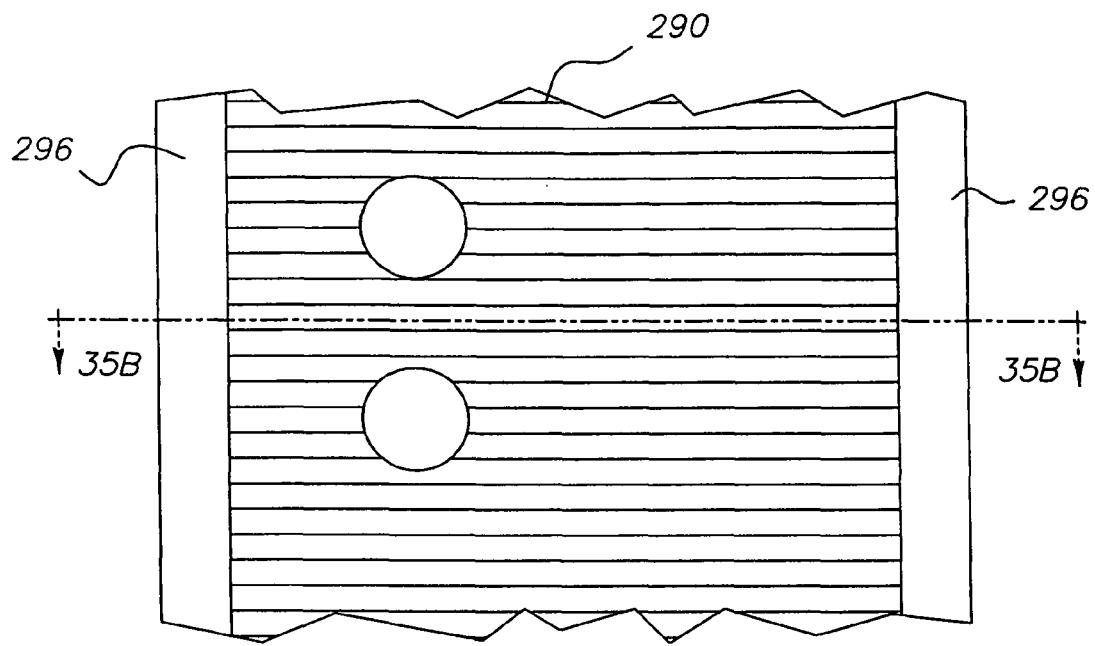
FIGS. 35A and 35B are plan and sectional views, respectively, illustrating a pile article similar to the article shown in FIG. 15 which can be sewn into an opening for providing a light block in upholstery, carpet, seat cover or clothing.
Figure 35B:
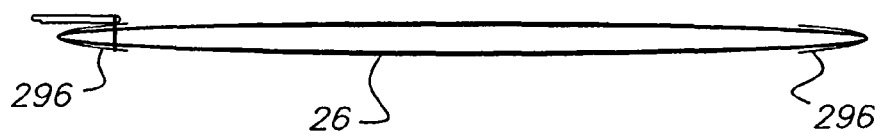

FIGS. 35A and 35B show continuous loop pile articles of FIG. 15 which are sufficiently long to provide a filler 290 for an opening in a curtain, an upholstered item or a carpet. It may be preferable to use loops which are connected at their ends by ultrasonic welding without backing strips or to textile backing strips, as discussed above. Such loops may contain monofilaments internally thereof as discussed in connection with FIGS. 1-3. In providing the article 290, the end portions may be attached by fabric basting 296. Stitching the basting connects panels containing the yarn loops 26. These panels being sufficiently flexible to provide, when sewn together, a filler or covering of desired width.

From the foregoing description it will be apparent that there has been provided improved methods and apparatus for making pile articles and particularly weatherseals, brushes and the like. Numerous pile articles and their applications have been shown and described. Of course, variations and modifications in the herein described apparatus and methods and in the pile articles and their installations and applications, within the scope of the invention, will undoubtedly become apparent to those skilled in the art. Accordingly the foregoing description should be taken as illustrative and not in a limiting sense.

The invention claimed is:

1. A pile article comprising a helically winding of filamentary material having loops with opposite sides and opposite ends, backing strips attached to and along the ends of said loops to provide a longitudinally extending and continuous pile with both of said sides of each of said loops being continuous to provide a resilient support member.

2. The pile article according to claim 1 wherein both of said sides define an arch or bow which provides a support surface.

3. The pile article according to claim 1 wherein said loops present a sealing surface on an outside surface of at least one of said sides.

4. The pile article according to claim 1 wherein said strips either are in generally parallel relationship, or in angularly related relationship with said pile forming a bridge therebetween or an arch or bow between said strips and said adjacent edges either being spaced from or adjoining each other.

5. The pile article according to claim 4 wherein said backing strips are assembled on a closing surface of a door or panel, said bow or arch projecting from said closing surface and presenting a resilient support or seal at a closing surface of another surface presented by a member providing panel or frame.

6. The pile article according to claim 5 wherein said another surface is opposite to said closing surface, another pile article having backing strips attached to said another surface and presenting an arch or bow of pile loops engageable with said arch or bow projecting from said closing surface.

7. The pile article according to claim 5 wherein said another surface is a threshold member.

8. The pile article according to claim 5 wherein said bow or arch on said closing surface is engageable with a pivotable door sash presenting a closing surface.

9. The pile article according to claim 4 wherein said backing strips are supported in a door or panel attached to a frame by the bow or arch of said pile loops so as to define a hinge on which said door or panel and frame are pivotably interconnected.

10. The pile article according to claim 4 wherein a pile article having said bow or arch or a pair of said pile articles having said bows or arches have loops of conductive filamentary material, and said bows and arches pressing a surface or opposed surfaces past which a medium is movable for discharge of electrostatic charge on said medium.

11. The pile article according to claim 4 wherein said backing strips are parallel to each other and disposed in support members which are spaced from each other to define a gap across which said pile bridge extends and at least one of said sides of said loop presents a support or sealing surface.

12. The pile article according to claim 4 wherein said loops provide a spring between members engaging said backing strips said backing strips each being engaged by a different one of said members so as to compress said spring provided by said loops.

13. The pile article according to claim 12 wherein said backing strips and pile are arranged in a ring so that said pile defines a tubular spring.

14. The pile article according to claim 4 wherein said backing strips are strips of flexible material arranged with said pile therebetween in a belt, said belt being disposable around pulleys so that said belt rotates with said pulleys.

15. The pile article according to claim 1 wherein backing strips are attached to and along the ends of said loops, said backing strips being disposed either parallel to each other or in angular relationship, said bow or arch bridging said strips, and when said strips are in angular relationship, bridging the angle between said strips.

16. The pile article according to claim 15 wherein said backing strips are disposed on opposite sides of a corner defined by a frame and said bow or arch presents a resilient support or a sealing support across said corner for a member movable with respect to said frame into and out of said corner.

* * * * *